United States Patent
Zhu

(10) Patent No.: US 10,673,679 B2
(45) Date of Patent: Jun. 2, 2020

(54) SERVICE MIGRATION METHOD, APPARATUS, AND SYSTEM

(71) Applicant: HUAWEI TECHNOLOGIES CO., LTD., Shenzhen, Guangdong (CN)

(72) Inventor: Qianghua Zhu, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 90 days.

(21) Appl. No.: 16/052,349

(22) Filed: Aug. 1, 2018

(65) Prior Publication Data

US 2018/0341520 A1    Nov. 29, 2018

Related U.S. Application Data

(63) Continuation of application No. PCT/CN2016/073538, filed on Feb. 4, 2016.

(51) Int. Cl.
*H04L 29/06* (2006.01)
*H04W 28/00* (2009.01)
(Continued)

(52) U.S. Cl.
CPC .......... *H04L 29/06* (2013.01); *H04L 65/1016* (2013.01); *H04L 67/1014* (2013.01);
(Continued)

(58) Field of Classification Search
CPC . H04L 29/06; H04L 67/1014; H04L 65/1016; H04L 67/148; H04W 36/0033; H04W 28/00
See application file for complete search history.

(56) References Cited

U.S. PATENT DOCUMENTS

2012/0254384 A1*  10/2012  Tremblay ............ H04L 67/1002
                                                                   709/223
2013/0198564 A1    8/2013  Hasit
(Continued)

FOREIGN PATENT DOCUMENTS

CN           101262639 A      9/2008
CN           101742175 A      6/2010
(Continued)

OTHER PUBLICATIONS

Yun Chao Hu et al.,"Mobile Edge Computing A key technology towards 5G" ETSI White Paper No. 11,First edition—Sep. 2015,total 16 pages.
(Continued)

*Primary Examiner* — Michael A Keller
(74) *Attorney, Agent, or Firm* — Womble Bond Dickinson (US) LLP

(57) ABSTRACT

Embodiments of the present application relate to the field of computer technologies, and provide a service migration method, apparatus, and system. The method is performed by a target mobile edge platform, including: receiving a service migration request sent by a source mobile edge platform; obtaining a service endpoint corresponding to a service identifier; and sending a service migration response to the source mobile edge platform. In this way, a problem of migrating a service from the source mobile edge platform to the target mobile edge platform is resolved, and it can be ensured that after the service is migrated from the source mobile edge platform to the target mobile edge platform, a local mobile edge platform that subscribes to the service on the source mobile edge platform can continue to correctly use the service migrated to the target mobile edge platform.

14 Claims, 21 Drawing Sheets

(51) Int. Cl.
*H04L 29/08* (2006.01)
*H04W 36/00* (2009.01)

(52) U.S. Cl.
CPC .......... *H04L 67/148* (2013.01); *H04W 28/00* (2013.01); *H04W 36/0033* (2013.01)

(56) References Cited

U.S. PATENT DOCUMENTS

| | | |
|---|---|---|
| 2013/0215739 A1* | 8/2013 | Zhang .................. H04W 40/14 370/228 |
| 2015/0056995 A1 | 2/2015 | Baillargeon |
| 2015/0124622 A1 | 5/2015 | Kovvali et al. |
| 2015/0365819 A1* | 12/2015 | Zhu ........................ H04W 8/22 455/418 |
| 2017/0251514 A1* | 8/2017 | Soderlund ........... H04L 61/2007 |

FOREIGN PATENT DOCUMENTS

| | | |
|---|---|---|
| CN | 103218260 A | 7/2013 |
| CN | 103430516 A | 12/2013 |
| EP | 2528300 A1 | 11/2012 |
| WO | 2010063175 A1 | 6/2010 |

OTHER PUBLICATIONS

Kiryong Ha et al.,"Adaptive VM Handoff Across Cloudlets"CMU-CS-15-113,dated Jun. 2015,total 27 pages.

* cited by examiner

SERVICE MIGRATION METHOD, APPARATUS, AND SYSTEM

CROSS-REFERENCE TO RELATED APPLICATIONS

This application is a continuation of International Application No. PCT/CN2016/073538, filed on Feb. 4, 2016, the disclosure of which is hereby incorporated by reference in its entirety.

TECHNICAL FIELD

Embodiments of the present application relate to the field of computer technologies, and in particular, to a service migration method, apparatus, and system.

BACKGROUND

A mobile edge computing (MEC) technology means that a mobile edge server is deployed in a mobile communications network to provide, in a proximity manner, an Internet technology (IT) service for user equipment (UE) accessing the mobile communications network.

The mobile edge computing technology can be used to provide a plurality of services for the UE, and these services may be provided by a mobile edge platform, or may be provided by a service provider on a mobile edge platform. The mobile edge platform is an application program platform provided in the mobile edge server, and the service provider is an application program that runs on the mobile edge platform and that is used to provide a service.

When the mobile edge platform cannot meet a service requirement, for example, when the mobile edge platform cannot meet a performance requirement required by the service provider, or the service provider cannot meet a service quality requirement, or the service provider responses to a system load balance request, a service needs to be migrated from a source mobile edge platform to a target mobile edge platform. However, there is no related service migration technology in the prior art.

SUMMARY

To resolve a problem of migrating a service from a source mobile edge platform to a target mobile edge platform, embodiments of the present application provide a service migration method, apparatus, and system. The technical solutions are as follows:

According to a first aspect, a service migration method is provided, and the method includes:

receiving, by a target mobile edge platform, a service migration request sent by a source mobile edge platform, where the service migration request is used to request to migrate a service provided by a service provider, the service migration request includes a service identifier of the service, and the service identifier is used to identify the service in at least one service;

obtaining, by the target mobile edge platform, a service endpoint corresponding to the service identifier, where the service endpoint is an access address used when the service provider provides the service; and sending, by the target mobile edge platform, a service migration response to the source mobile edge platform.

After the target mobile edge platform receives the service migration request sent by the source mobile edge platform, the target mobile edge platform obtains the service endpoint corresponding to the service identifier, and the target mobile edge platform sends the service migration response to the source mobile edge platform, so that the service is successfully migrated from the source mobile edge platform to the target mobile edge platform.

In a first possible implementation of the first aspect, after the obtaining, by the target mobile edge platform, a service endpoint corresponding to the service identifier, the method further includes:

generating, by the target mobile edge platform, a target temporary service endpoint based on the service endpoint and an Internet Protocol (IP) address of the target mobile edge platform, where the target temporary service endpoint is an access address used when the service provider provides the service by using the target mobile edge platform.

After obtaining the service endpoint, the target mobile edge platform generates the target temporary service endpoint based on the service endpoint and the IP address of the target mobile edge platform. Therefore, the target mobile edge platform generates, based on the obtained service endpoint, the target temporary service endpoint related to the IP address of the target mobile edge platform.

In a second possible implementation of the first aspect, after the obtaining, by the target mobile edge platform, a service endpoint corresponding to the service identifier, the method further includes:

sending, by the target mobile edge platform, a route update request to a routing table controller, where the route update request includes the service endpoint and an IP address of the target mobile edge platform, and the route update request is used to request the routing table controller to update a path pointing to the service endpoint.

The target mobile edge platform sends the route update request to the routing table controller, so as to update a routing table of the service, and routes service-related data to a target temporary service endpoint by using an updated routing table. Therefore, a service consumer using the service accesses the migrated service by using the updated routing table.

In a third possible implementation of the first aspect, after the obtaining, by the target mobile edge platform, a service endpoint corresponding to the service identifier, the method further includes:

storing, by the target mobile edge platform, a correspondence between the service endpoint and a tunnel, where the tunnel is a tunnel between a local mobile edge platform and the target mobile edge platform, the local mobile edge platform is a mobile edge platform on which a service consumer using the service is located, and the tunnel is used to transmit data between the service consumer and the service provider.

The target mobile edge platform establishes a routing policy between the local mobile edge platform and the target mobile edge platform by storing the correspondence between the service endpoint and the tunnel, so that the service consumer using the service can access the migrated service by using the established tunnel.

With reference to the first aspect and the first possible implementation of the first aspect, in a fourth possible implementation of the first aspect, after the sending, by the target mobile edge platform, a service migration response to the source mobile edge platform, the method further includes:

receiving, by the target mobile edge platform, a subscription request sent by the local mobile edge platform, where the subscription request is used to subscribe to the service on the target mobile edge platform; and sending, by the target mobile edge platform, service information to the local mobile edge platform, where the service information includes the service identifier and the target temporary service endpoint.

The target mobile edge platform receives the subscription request sent by the local mobile edge platform, and the target mobile edge platform sends the service information to the local mobile edge platform that subscribes to the service. Therefore, by subscribing to the target mobile edge platform, after the service is migrated, the local mobile edge platform that subscribes to the service can still correctly use the service migrated to the target mobile edge platform, so as to ensure availability and reliability of a service provided by the service consumer for user equipment.

With reference to the second possible implementation of the first aspect or the third possible implementation of the first aspect, in a fifth possible implementation of the first aspect, after the sending, by the target mobile edge platform, a service migration response to the source mobile edge platform, the method further includes:

receiving, by the target mobile edge platform, a subscription request sent by the local mobile edge platform, where the subscription request is used to subscribe to the service on the target mobile edge platform; and sending, by the target mobile edge platform, service information to the local mobile edge platform, where the service information includes the service identifier and the service endpoint.

The target mobile edge platform receives the subscription request sent by the local mobile edge platform, and the target mobile edge platform sends the service information to the local mobile edge platform that subscribes to the service. Therefore, by subscribing to the target mobile edge platform, after the service is migrated, the local mobile edge platform that subscribes to the service can still correctly use the service migrated to the target mobile edge platform, so as to ensure availability and reliability of a service provided by the service consumer for user equipment.

With reference to the first aspect, or the first possible implementation of the first aspect, or the second possible implementation of the first aspect, or the third possible implementation of the first aspect, or the fourth possible implementation of the first aspect, or the fifth possible implementation of the first aspect, in a sixth possible implementation of the first aspect, the obtaining, by the target mobile edge platform, a service endpoint corresponding to the service identifier includes:

obtaining, from the service migration request, the service endpoint corresponding to the service identifier; or receiving the service endpoint that is corresponding to the service identifier and that is sent by the service provider.

The target mobile edge platform may obtain, by using the service migration request sent by the source mobile edge platform, the service endpoint corresponding to the service identifier, or may directly receive the service endpoint that is corresponding to the service identifier and that is sent by the service provider. Therefore, manners of obtaining the service endpoint by the target mobile edge platform are diversified.

With reference to the sixth possible implementation of the first aspect, in a seventh possible implementation of the first aspect, the receiving the service endpoint that is corresponding to the service identifier and that is sent by the service provider includes:

receiving a registration request sent by the service provider, where the registration request includes the service endpoint corresponding to the service identifier; or sending a re-registration indication to the service provider, and receiving the registration request sent by the service provider, where the registration request includes the service endpoint corresponding to the service identifier.

The target mobile edge platform directly receives, in two manners, the service endpoint that is corresponding to the service identifier and that is sent by the service provider: The service provider may actively send the registration request to the target mobile edge platform; or the target mobile edge platform may actively send the re-registration indication to the service provider, and the service provider sends the registration request to the target mobile edge platform based on the re-registration indication. Therefore, manners of registering the service with the target mobile edge platform by the service provider are diversified.

According to a second aspect, a service migration method is provided, and the method includes:

sending, by a source mobile edge platform, a service migration request to a target mobile edge platform, where the service migration request is used to request to migrate a service provided by a service provider, the service migration request includes a service identifier of the service, and the service identifier is used to identify the service in at least one service; and receiving, by the source mobile edge platform, a service migration response sent by the target mobile edge platform.

The source mobile edge platform sends the service migration request to the target mobile edge platform, and receives the service migration response sent by the target mobile edge platform, so that the service is migrated from the source mobile edge platform to the target mobile edge platform.

In a first possible implementation of the second aspect, the sending, by a source mobile edge platform, a service migration request to a target mobile edge platform includes:

sending, by the source mobile edge platform, the service migration request to the target mobile edge platform when determining that the service needs to be migrated; or receiving, by the source mobile edge platform, a migration request sent by the service provider, where the migration request is sent by the service provider when the service provider determines that the service needs to be migrated; and sending, by the source mobile edge platform, the service migration request to the target mobile edge platform.

The source mobile edge platform directly sends the service migration request to the target mobile edge platform when determining that the service needs to be migrated; or the service provider may send the migration request to the source mobile edge platform when determining that the service needs to be migrated, and the source mobile edge platform sends the service migration request to the target mobile edge platform based on the migration request. Therefore, manners of sending the service migration request by the source mobile edge platform are diversified.

In a second possible implementation of the second aspect, after the receiving, by the source mobile edge platform, a service migration response sent by the target mobile edge platform, the method further includes:

sending, by the source mobile edge platform, service migration information to a local mobile edge platform that subscribes to the service, where the service migration information includes the service identifier and an IP address of the target mobile edge platform, and the local mobile edge platform is a mobile edge platform on which a service consumer using the service is located; and receiving, by the source mobile edge platform, a subscription cancellation request sent by the local mobile edge platform, where the subscription cancellation request is used to cancel the subscribed service on the source mobile edge platform.

The source mobile edge platform sends the service migration information to the local mobile edge platform that subscribes to the service, so as to cancel the service to which the local mobile edge platform subscribes on the source mobile edge platform. Therefore, after the service is migrated from the source mobile edge platform to the target mobile edge platform, the service consumer that subscribes to the service on the source mobile edge platform can still use the migrated service.

With reference to the second possible implementation of the second aspect, in a third possible implementation of the second aspect, before the receiving, by the source mobile edge platform, a subscription cancellation request sent by the local mobile edge platform, the method further includes:

deleting, by the source mobile edge platform, a correspondence between a service endpoint and a tunnel, where the service endpoint is an access address used when the service provider provides the service, the tunnel is a tunnel between the local mobile edge platform and the source mobile edge platform, and the tunnel is used to transmit data between the service consumer and the service provider.

The source mobile edge platform deletes the correspondence between the service endpoint and the tunnel, so that the local mobile edge platform that subscribes to the service can establish a tunnel with the target mobile edge platform.

According to a third aspect, a service migration method is provided, and the method includes:

receiving, by a local mobile edge platform, service migration information sent by a source mobile edge platform, where the service migration information is used to indicate that a service provided by a service provider has been migrated to a target mobile edge platform, the service migration information includes a service identifier of the service and an IP address of the target mobile edge platform, and the service identifier is used to identify the service in at least one service;

sending, by the local mobile edge platform, a subscription cancellation request to the source mobile edge platform based on the service migration information, where the subscription cancellation request is used to cancel the subscribed service on the source mobile edge platform;

sending, by the local mobile edge platform, a subscription request to the target mobile edge platform based on the IP address of the target mobile edge platform, where the subscription request is used to subscribe to the service on the target mobile edge platform; and receiving, by the local mobile edge platform, service information sent by the target mobile edge platform, where the service information includes the service identifier; where the local mobile edge platform is a mobile edge platform on which a service consumer using the service is located.

The local mobile edge platform subscribes to the service on the source mobile edge platform. When the service is migrated from the source mobile edge platform to the target mobile edge platform, the local mobile edge platform cancels the subscribed service on the source mobile edge platform, and re-subscribes to the service on the target mobile edge platform. Therefore, the local mobile edge platform can still access the subscribed service after the service is migrated.

In a first possible implementation of the third aspect, the method further includes:

sending, by the local mobile edge platform, a tunnel deletion request to a local service network function entity, where the tunnel deletion request is used to delete a tunnel between the local mobile edge platform and the source mobile edge platform; and sending, by the local mobile edge platform, a tunnel establishment request to the local service network function entity, where the tunnel establishment request is used to establish a tunnel between the local mobile edge platform and the target mobile edge platform.

The local mobile edge platform deletes the tunnel between the local mobile edge platform and the source mobile edge platform, establishes the tunnel with the target mobile edge platform, and accesses the migrated service on the target mobile edge platform by using the established tunnel, so that a routing policy is updated by establishing a tunnel.

In a second possible implementation of the third aspect, the service information further includes a target temporary service endpoint of the service, and the target temporary service endpoint is an access address used when the service provider provides the service by using the target mobile edge platform.

The service information includes the target temporary service endpoint of the service, so that the local mobile edge platform accesses the migrated service on the target mobile edge platform based on the target temporary service endpoint included in the service information.

In a third possible implementation of the third aspect, the service information further includes a service endpoint of the service, and the service endpoint is an access address used when the service provider provides the service.

The service information includes the service endpoint of the service, so that the local mobile edge platform accesses the migrated service on the target mobile edge platform based on the service endpoint included in the service information.

With reference to the second possible implementation of the third aspect, in a fourth possible implementation of the third aspect, after the receiving, by the local mobile edge platform, service information sent by the target mobile edge platform, the method further includes:

generating, by the local mobile edge platform, a local temporary service endpoint based on the target temporary service endpoint and an IP address of the local mobile edge platform, where the local temporary service endpoint is an access address used when the service provider provides the service by using the local mobile edge platform; and sending, by the local mobile edge platform, local service information to the service consumer using the service, where the local service information includes the service identifier and the local temporary service endpoint.

The local mobile edge platform generates the local temporary service endpoint based on the target temporary service endpoint and the IP address of the local mobile edge platform, so that the service consumer can access the migrated service on the target mobile edge platform by using the local temporary service endpoint.

With reference to the second possible implementation of the third aspect or the third possible implementation of the third aspect, in a fourth possible implementation of the third aspect, after the receiving, by the local mobile edge platform, service information sent by the target mobile edge platform, the method further includes:

sending, by the local mobile edge platform, the service information to the service consumer using the service.

The local mobile edge platform sends the service information to the service consumer using the service, so that the service consumer can access the subscribed service by using the service endpoint or the target temporary service endpoint.

According to a fourth aspect, a service migration apparatus is provided, the apparatus includes at least one unit, and the at least one unit is configured to implement the service migration method provided in any one of the first aspect or the possible implementations of the first aspect.

According to a fifth aspect, a service migration apparatus is provided, the apparatus includes at least one unit, and the at least one unit is configured to implement the service migration method provided in any one of the second aspect or the possible implementations of the second aspect.

According to a sixth aspect, a service migration apparatus is provided, the apparatus includes at least one unit, and the at least one unit is configured to implement the service migration method provided in any one of the third aspect or the possible implementations of the third aspect.

According to a seventh aspect, a service migration system is provided, and the system includes a target mobile edge platform, a source mobile edge platform, and a local mobile edge platform;

the target mobile edge platform includes the service migration apparatus according to the fourth aspect;

the source mobile edge platform includes the service migration apparatus according to the fifth aspect; and the local mobile edge platform includes the service migration apparatus according to the sixth aspect.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

To make the objectives, technical solutions, and advantages of the present application clearer, the following further describes the implementations of the present application in detail with reference to the accompanying drawings.

Figure 1A:
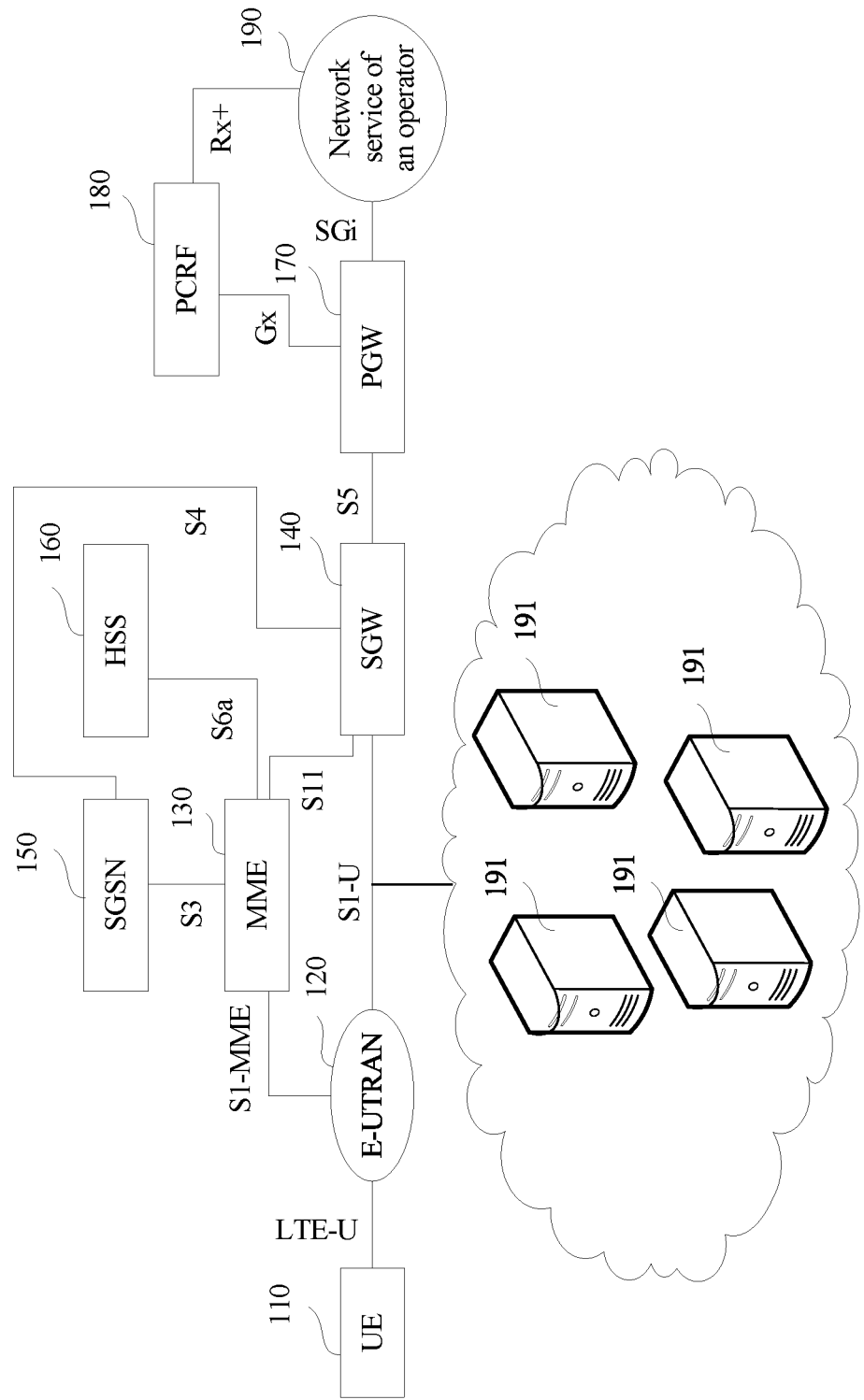
FIG. 1A is a schematic diagram of an evolved packet system (EPS) network architecture according to an example embodiment of the present application.

Referring to FIG. 1A, FIG. 1A is a schematic diagram of an evolved packet system (EPS) network architecture according to an example embodiment of the present application. The network architecture may include user equipment (UE) 110, an evolved universal terrestrial radio access network (E-UTRAN) 120, a mobility management entity (MME) 130, a serving gateway (SGW) 140, a serving general packet radio system support node (SGSN) 150, a home subscriber server (HSS) 160, a packet data network gateway (PGW) 170, and a policy and charging rules function (PCRF) 180.

The UE 110 is connected to the E-UTRAN 120 through an interface LTE-U.

The E-UTRAN 120 is a network that includes a plurality of evolved NodeBs (eNodeB). The E-UTRAN 120 may include functions such as a radio physical layer function, resource scheduling, radio resource management, radio access control, and mobility management. The E-UTRAN 120 is connected to the SGW 140 through a user interface S1-U, and data is transmitted between the E-UTRAN 120 and the SGW 140 by using a general packet radio service (GPRS) tunneling protocol-user plane (GTP-U). The E-UTRAN 120 is connected to the MME 130 through a control plane interface S1-MME, and a function such as radio access bearer control is implemented between the E-UTRAN 120 and the MME 130 by using an S1-AP protocol.

The MME 130 mainly includes a control plane function in session management. The control plane function includes a non-access stratum (NAS) signaling and security, tracking area list (TAL) management, and the like. The MME 130 is connected to the SGW 140 through an interface S11, is connected to the SGSN 150 through an interface S3, and is connected to the HSS 160 through an interface S6a.

The SGW 140 mainly includes functions such as data transmission, data forwarding, and route switching that are of the UE 110, and is used as a local mobility anchor when the UE 110 is handed over between eNodeBs. Each UE 110 is served by only one SGW 140 at a same moment. The SGW 140 is connected to the PGW 170 through an interface S5, and is connected to the SGSN 150 through an interface S4.

The PGW 170 is an anchor connected to a packet data network (PDN), and mainly includes functions such as network address allocation for the UE 110, and data packet filtering, rate control, and counting information generation that are for the UE 110. The PGW 170 is connected to the PCRF 180 through an interface Gx.

The PGW 170 is connected to a network service of an operator through an interface SGi, and the PCRF 180 is connected to the network service 190 of the operator through an interface Rx+.

A mobile edge server 191 is mainly located at the user interface S1-U, and a mobile edge platform can process only data on a user plane in an EPS system. Optionally, the mobile edge server 191 may include functions such as a communications service and service registration. The communications service and the service registration enable a service provider in the mobile edge server 191 to provide, by using the mobile edge platform, network information for a service consumer for use. Optionally, a node at a layer above a layer of the mobile edge platform is the SGW 140, and a node at a layer below the layer of the mobile edge platform is an eNodeB.

Figure 1B:
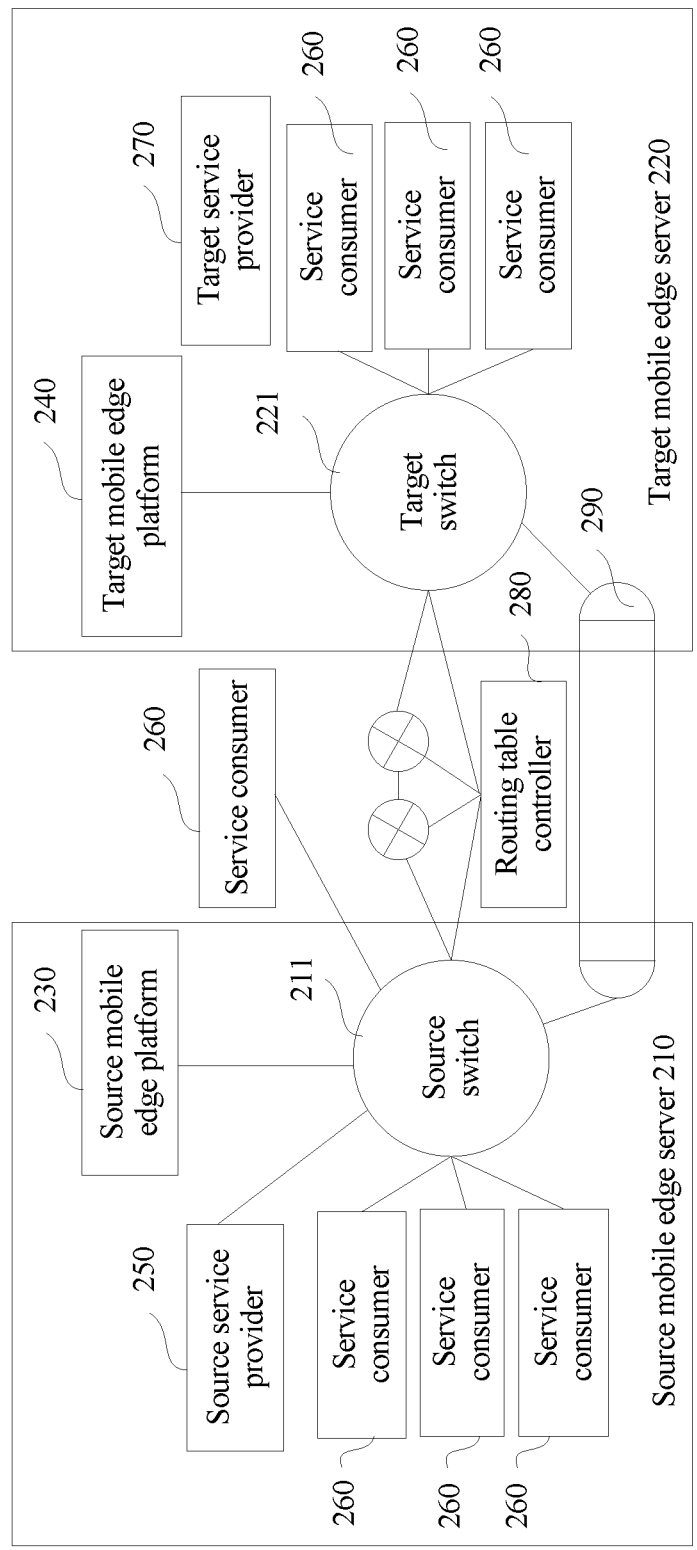
FIG. 1B is a schematic diagram of a service migration solution according to an example embodiment of the present application.

Referring to FIG. 1B, FIG. 1B is a schematic diagram of a service migration implementation environment in a mobile edge system according to an example embodiment of the present application. The implementation environment may include a source mobile edge server 210, a target mobile edge server 220, a source mobile edge platform 230, a target mobile edge platform 240, a source service provider 250, a service consumer 260, and a target service provider 270.

The source mobile edge server 210 may include the source mobile edge platform 230, the source service provider 250, the service consumer 260, and a source switch 211. The source mobile edge platform 230, the source service provider 250, and at least one service consumer 260 using a service are separated connected to the source switch 211. Optionally, the at least one service consumer 260 that uses a service and that is connected to the source switch 211 may be a service consumer 260 inside the source mobile edge platform 230, or may be a service consumer 260 on a local mobile edge platform (not shown in the figure).

The source service provider 250 provides, by using the source switch 211, a service for the service consumer 260 using a service, and the service consumer 260 using a service accesses, by using the source switch 211, the service provided by the source service provider 250.

The source service provider 250 is an application providing a service in the source mobile edge server 210, and the service consumer 260 is an application using a service.

The target mobile edge server 220 may include the target mobile edge platform 240, the target service provider 270, the service consumer 260, and a target switch 221. The target mobile edge platform 240 and at least one service consumer 260 are separately connected to the target switch 221. Optionally, the at least one service consumer 260 that uses a service and that is connected to the target switch 221 may be a service consumer 260 inside the target mobile edge platform 240, or may be a service consumer 260 on the local mobile edge platform (not shown in the figure).

The target service provider 270 is an application providing a service in the target mobile edge server 240.

Communication is established between the source mobile edge server 210 and the target mobile edge server 220 in three different manners.

In a first optional implementation, a service mapping table (not shown in the figure) is established on the source mobile edge platform 230, and a source temporary service endpoint is generated based on a service endpoint of a service. A service mapping table (not shown in the figure) is established on the target mobile edge platform 240, and a target temporary service endpoint is generated based on the service endpoint. When the service is registered with the source mobile edge platform 230, service-related data is routed to the source temporary service endpoint. When the service is migrated to the target mobile edge platform 240, the service-related data is routed to the target temporary service endpoint.

The service endpoint is an access address used when a service provider provides a service, the source temporary service endpoint is an access address used when the service provider provides a service by using the source mobile edge platform, and the target temporary service endpoint is an access address used when the service provider provides a service by using the target mobile edge platform.

The service endpoint includes an IP address and a source path that are of the service provider, the source temporary service endpoint includes an IP address and a source path that are of the source mobile edge platform, and the target temporary service endpoint includes an IP address and a source path that are of the target mobile edge platform.

In a second possible implementation, communication is established between the source switch 211 and the target switch 221 by using a routing table controller 280. When a service is registered with the source mobile edge platform 230, the source mobile edge platform 230 updates routing tables in all switches by using the routing table controller 280, and routes service-related data to a service endpoint related to the source mobile edge platform 230. When the service is migrated to the target mobile edge platform 240, the target mobile edge platform 240 updates the routing tables in all the switches by using the routing table controller 280, and routes the service-related data to a service endpoint related to the target mobile edge platform 240.

In a third possible implementation, communication is established between the source switch 211 and the target switch 221 by using a tunnel 290. When a service is registered with the source mobile edge platform 230, the local mobile edge platform establishes a tunnel 290 with the source mobile edge platform 230, and transmits service-related data between the local mobile edge platform and the source mobile edge platform 230 by using the tunnel 290. When the service is migrated to the target mobile edge platform 240, the local mobile edge platform deletes the tunnel 290 between the local mobile edge platform and the source mobile edge platform 230, establishes a tunnel 290 with the target mobile edge platform, and transmits the service-related data between the local mobile edge platform and the target mobile edge platform 240 by using the tunnel 290.

Figure 2:
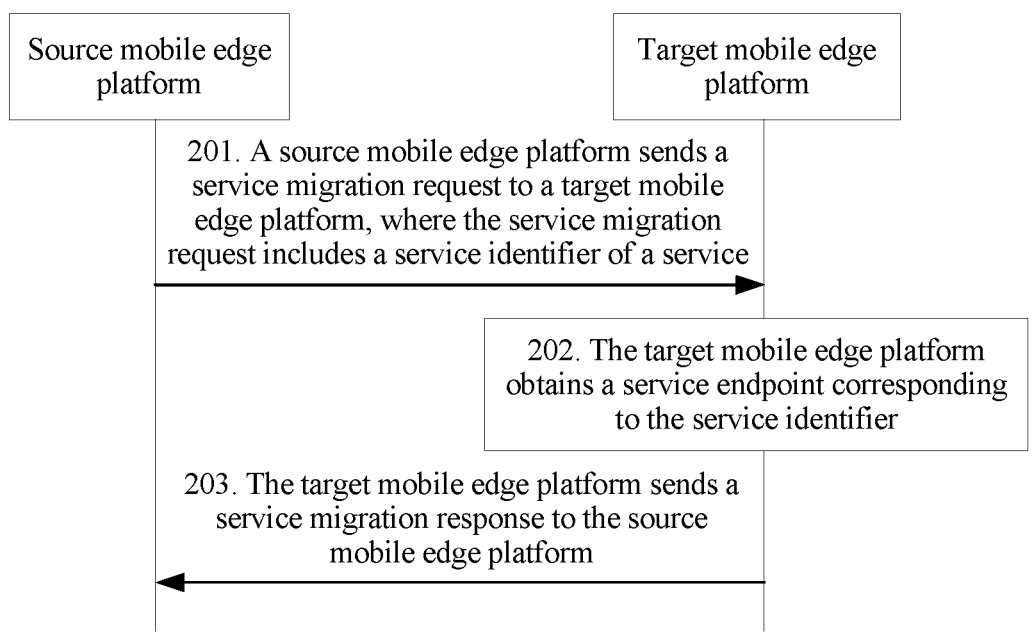
FIG. 2 is a flowchart of a service migration method according to an example embodiment of the present application.

Referring to FIG. 2, FIG. 2 is a flowchart of a service migration method according to an example embodiment of the present application. This embodiment is described by using an example in which the method is applied to the implementation environment shown in FIG. 1B. The service migration method includes the following steps.

Operation 201: A source mobile edge platform sends a service migration request to a target mobile edge platform, where the service migration request includes a service identifier of a service.

The service migration request is used to request to migrate a service provided by a service provider, and the service identifier is used to identify the service in at least one service.

When the service needs to be migrated, the source mobile edge platform sends the service migration request to the target mobile edge platform to which the service is to be migrated. The service migration request includes at least the service identifier (Service ID) of the service.

Correspondingly, the target mobile edge platform receives the service migration request sent by the source mobile edge platform. The service migration request is used to request to migrate the service provided by the service provider, the service migration request includes the service identifier of the service, and the service identifier is used to identify the service in at least one service.

Operation 202: The target mobile edge platform obtains a service endpoint corresponding to the service identifier.

The service endpoint is an access address used when the service provider provides the service.

The service endpoint includes an Internet protocol (IP) address and a source path that are of the service provider. For example, the service endpoint corresponding to the service identifier is "http//192.168.0.1/b63ac32311212ec.html?st=1", where "192.168.0.1" is the IP address of the service provider, and "b63ac32311212ec.html?st=1" is the resource path.

The target mobile edge platform obtains, based on the service identifier in the service migration request, the service endpoint corresponding to the service identifier.

Operation 203: The target mobile edge platform sends a service migration response to the source mobile edge platform.

After obtaining the service endpoint corresponding to the service identifier, the target mobile edge platform sends the service migration response to the source mobile edge platform. The service migration response is used to notify the source mobile edge platform that service migration is completed.

Correspondingly, the source mobile edge platform receives the service migration response sent by the target mobile edge platform.

In conclusion, according to the service migration method provided in this embodiment, the source mobile edge platform sends the service migration request to the target mobile edge platform, and the service migration request includes the service identifier of the service. The target mobile edge platform obtains the service endpoint corresponding to the service identifier, and the target mobile edge platform sends the service migration response to the source mobile edge platform. In this way, a problem of migrating the service provider from the source mobile edge platform to the target mobile edge platform is resolved, and the service provider is migrated from the source mobile edge platform to the target mobile edge platform.

It should be noted that, a process of migrating a service from the source mobile edge platform to the target mobile edge platform includes three possible solutions: First, the service provider is first migrated from the source mobile edge platform to the target mobile edge platform, and services provided by the service provider are then separately migrated to the target mobile edge platform. Second, the service provided by the service provider is first migrated to the target mobile edge platform, and the service provider is then migrated to the target mobile edge platform. Third, some services provided by the service provider are first migrated to the target mobile edge platform, the service provider is then migrated to the target mobile edge platform, and a remaining service provided by the service provider is finally migrated to the target mobile edge platform. Only after the service provider and the service provided by the service provider both are migrated to the target mobile edge platform, the service migrated to the target mobile edge platform can be normally accessed.

For example, one service provider provides five services. A process of migrating a service from the source mobile edge platform to the target mobile edge platform includes three possible solutions: First, the service provider is migrated from the source mobile edge platform to the target mobile edge platform, and the five services provided by the service provider are then separately migrated from the source mobile edge platform to the target mobile edge platform. Second, the five services provided by the service provider are first migrated from the source mobile edge platform to the target mobile edge platform, and the service provider is then migrated from the source mobile edge platform to the target mobile edge platform. Third, x services provided by the service provider are first migrated from the source mobile edge platform to the target mobile edge platform, the service provider is then migrated from the source mobile edge platform to the target mobile edge platform, and y services provided by the service provider are finally migrated from the source mobile edge platform to the target mobile edge platform, where x+y=5.

In the embodiment in FIG. 2, operations related to a target mobile edge platform side may be independently implemented as a service migration method on the target mobile edge platform side, and operations related to a source mobile edge platform side may be independently implemented as a service migration method on the source mobile edge platform side.

Figure 3A:
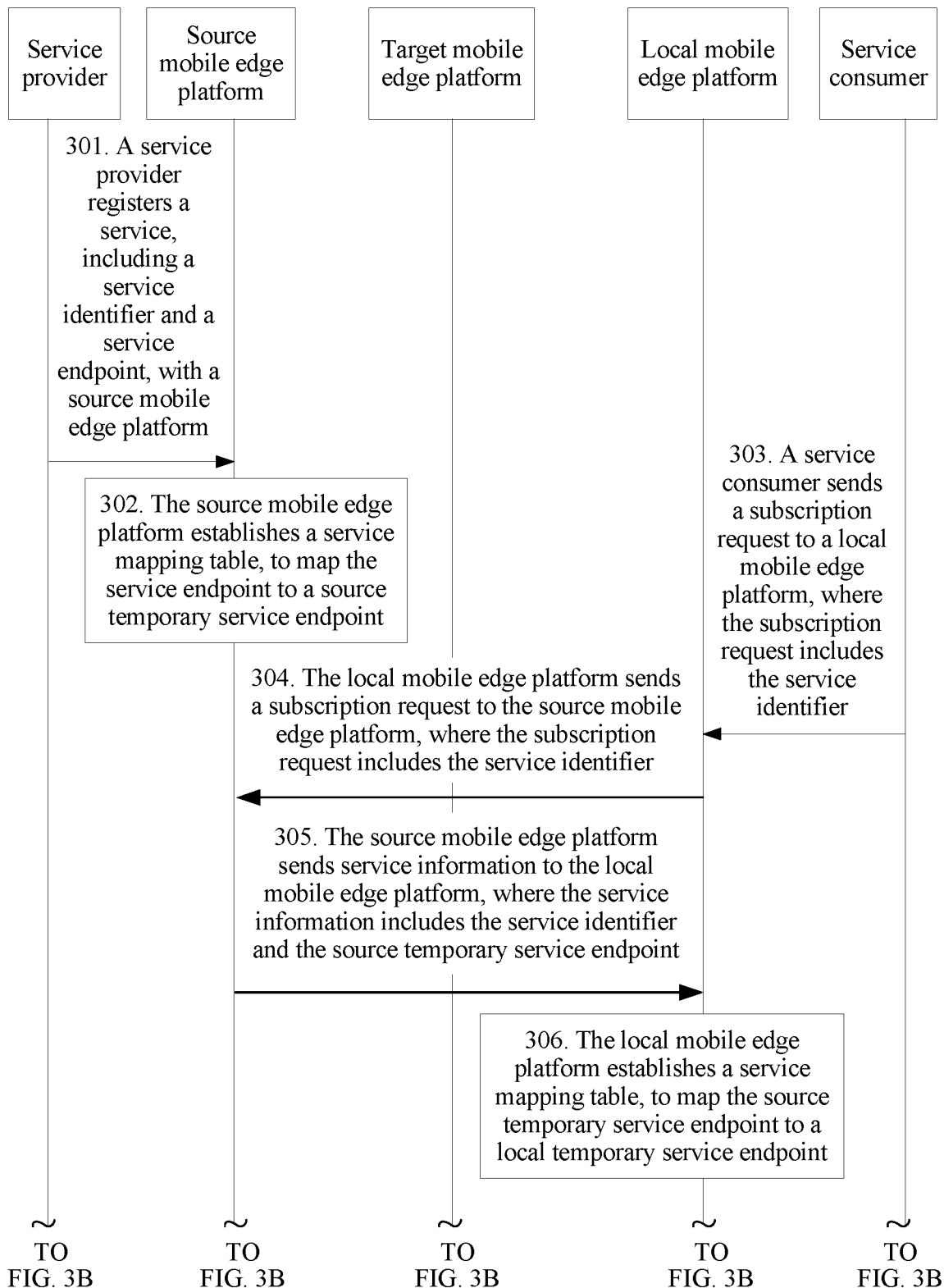
FIG. 3A, FIG. 3B, and FIG. 3C are a flowchart of a service migration method according to an example embodiment of the present application.
Figure 3B:
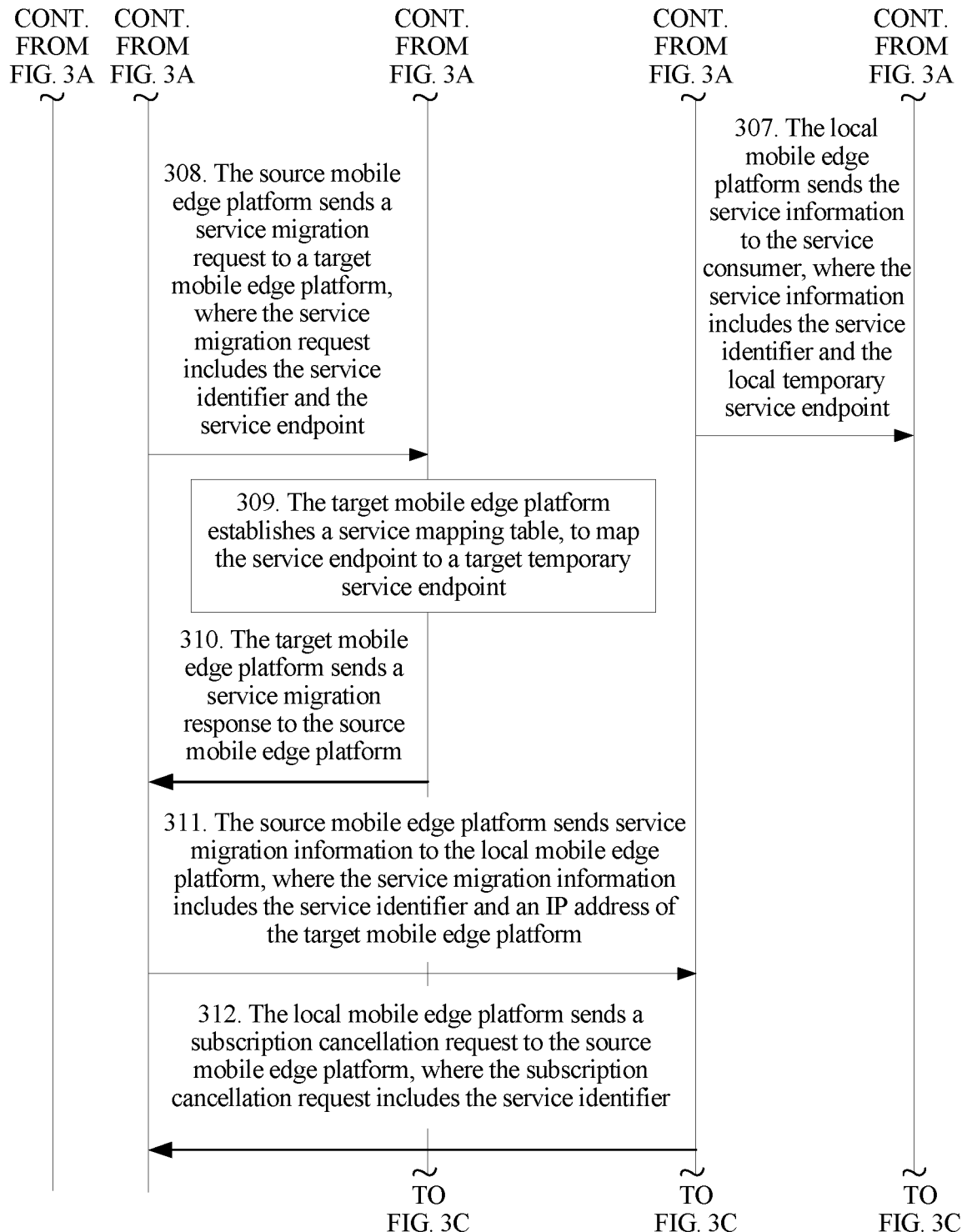
Figure 3C:
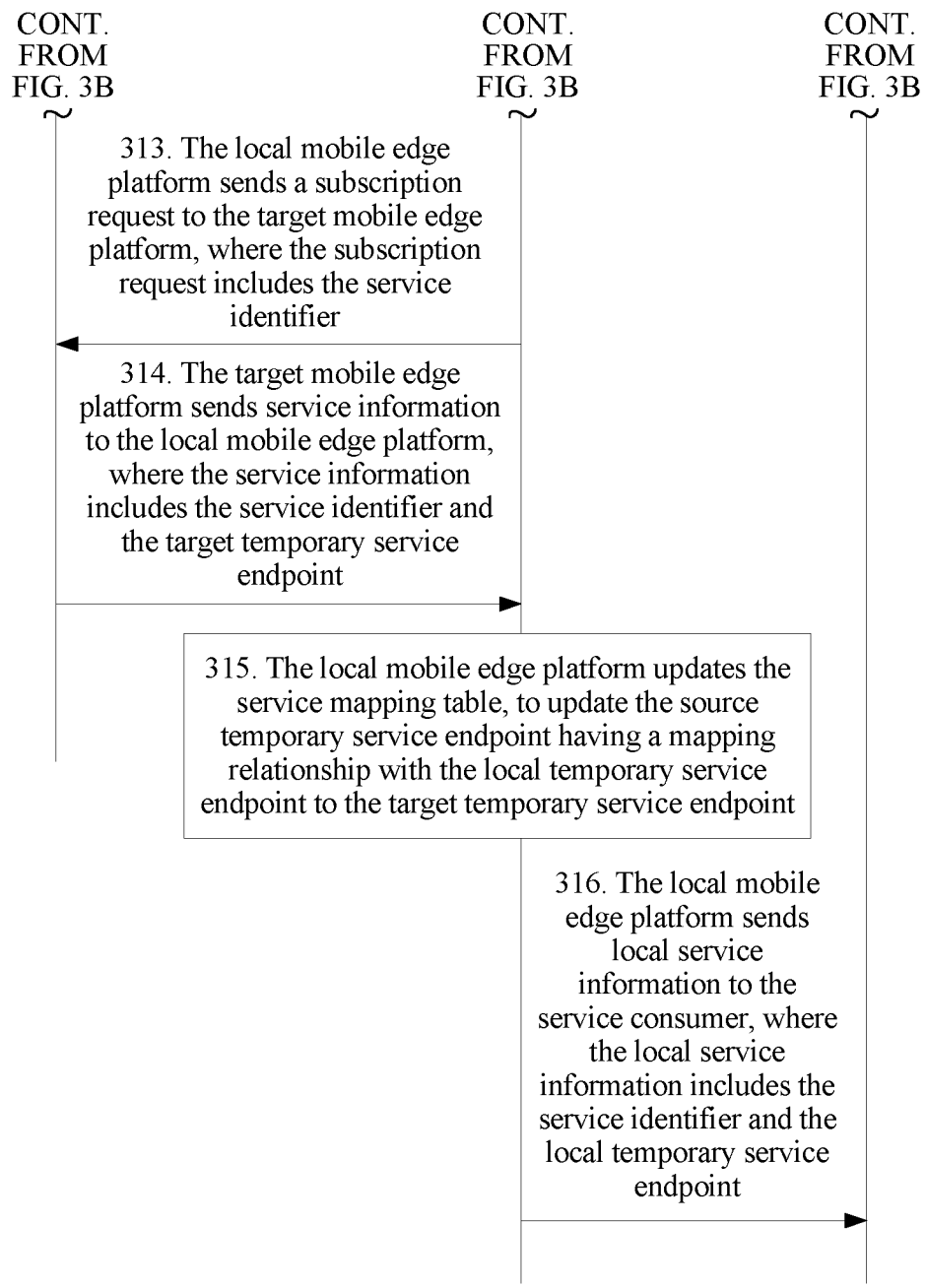

In an embodiment in FIG. 3A, FIG. 3B, and FIG. 3C, a source mobile edge server may include a service provider and a source mobile edge platform, a target mobile edge server may include a target mobile edge platform, and a local mobile edge server may include a local mobile edge platform and a service consumer.

Referring to FIG. 3A, FIG. 3B, and FIG. 3C, FIG. 3A, FIG. 3B, and FIG. 3C are a flowchart of a service migration method according to an example embodiment of the present application. This embodiment is described by using an example in which the method is applied to the implementation environment shown in FIG. 1B. The service migration method includes the following operations.

Operation 301 to operation 307 are a process in which a service provider registers a service with a source mobile edge platform, and a service consumer that is on a local mobile edge platform and that uses a service uses the registered service.

Operation 301: The service provider registers a service with the source mobile edge platform.

In a registration process, the service provider provides a service identifier (Service ID) and a service endpoint (S-endpoint) to the source mobile edge platform.

The service identifier is an identifier of a service provided by the service provider, and is used to identify the service in at least one service. Each service provided by the service provider is corresponding to a unique identifier. One service provider may provide one service, or may provide a plurality of services at a same time, and the plurality of services have different service identifiers.

The service endpoint is an access address used when the service provider provides the service, for example, a uniform resource locator (URL) or a uniform resource identifier (URI).

Optionally, the service endpoint usually includes an IP address and a resource path that are of the service provider.

Optionally, service endpoints corresponding to all services are also different. In other words, each service provided by the service provider is corresponding to a unique service identifier and service endpoint.

For example, one service provider may provide three services at a same time, and identifiers of all the services are different. Table 1 shows an example of a correspondence between a service and a service identifier.

TABLE 1

| Service provider | Service 1 | Service ID 1 | S-endpoint 1 |
|---|---|---|---|
| (Service | Service 2 | Service ID 2 | S-endpoint 2 |
| Provider) | Service 3 | Service ID 3 | S-endpoint 3 |

TABLE 2

| S-endpoint 1 | S-SB-endpoint 1 |
|---|---|
| S-endpoint 2 | S-SB-endpoint 2 |
| S-endpoint 3 | S-SB-endpoint 3 |

The service provider is an application providing a service, and the service endpoint is an access address used when the service provider provides the service.

Correspondingly, the source mobile edge platform receives the service identifier and the service endpoint provided by the service provider.

Operation 302: The source mobile edge platform establishes a service mapping table, to map a service endpoint to a source temporary service endpoint.

After receiving the service identifier and the service endpoint provided by the service provider, the source mobile edge platform establishes the service mapping table, and generates the source temporary service endpoint (S-SB-endpoint) based on the service endpoint (S-endpoint) provided by the service provider and an IP address of the source mobile edge platform. The service mapping table includes the service endpoint and the source temporary service endpoint, and the service mapping table is used to map the service endpoint to the corresponding source temporary service endpoint. The source temporary service endpoint includes the IP address of the source mobile edge platform.

The service endpoint includes the IP address and the resource path that are of the service provider, and the source temporary service endpoint includes the IP address and a resource path that are of the source mobile edge platform. The source mobile edge platform establishes the service mapping table, to map only the IP address, in the service endpoint, of the service provider to the IP address of the source mobile edge platform.

For example, the service endpoint provided by the service provider includes the IP address and the resource path that are of the service provider. Assuming that in the service endpoint, the IP address of the service provider is "192.168.0.1" and the resource path of the service provider is "b63ac32311212ec.html?st=1", the service endpoint provided by the service provider and received by the source mobile edge platform is "http//192.168.0.1/b63ac32311212ec.html?st=1". That the source mobile edge platform maps the service endpoint to the source temporary service endpoint is mapping the IP address, in the service endpoint, of the service provider to the IP address of the source mobile edge platform. Because the resource path in the service endpoint is the same as that in the source temporary service endpoint, only an IP address is changed in a process of mapping the service endpoint to the source temporary service endpoint, and a resource path is not changed. Assuming that the IP address of the source mobile edge platform is 192.168.1.1, the source mobile edge platform maps the service endpoint to a source temporary service endpoint "http//192.168.1.1/b63ac32311212ec.html?st=1" based on the IP address of the source mobile edge platform and the service endpoint.

Optionally, the source temporary service endpoint is an access address used when the service provider provides the service by using the source mobile edge platform.

Based on the service endpoints that are corresponding to the three services provided by the service provider and that are shown in Table 1, Table 2 shows an example of a mapping relationship between a service endpoint and a source temporary service endpoint.

The service endpoint is an access address used when the service provider provides the service. The source temporary service endpoint is an access address used to access the service registered with the source mobile edge platform, and the source temporary service endpoint includes the IP address of the source mobile edge platform.

Operation 303: The service consumer sends a subscription request to the local mobile edge platform, where the subscription request includes a service identifier.

The service consumer is an application using the service. The service consumer using the service sends the subscription request to the local mobile edge platform when the service consumer needs to use the service.

The local mobile edge platform is a mobile edge platform on which the service consumer using the service is located.

Correspondingly, the local mobile edge platform receives the subscription request sent by the service consumer.

Operation 304: The local mobile edge platform sends a subscription request to the source mobile edge platform, where the subscription request includes the service identifier.

After receiving the subscription request sent by the service consumer, the local mobile edge platform obtains the service identifier included in the subscription request. The local mobile edge platform queries, based on the service identifier, the source mobile edge platform on which the corresponding service is located.

The local mobile edge platform queries the source mobile edge platform based on the service identifier in two manners:

Manner 1: The local mobile edge platform queries, from a management node based on the service identifier, the source mobile edge platform on which the service corresponding to the service identifier is located.

Manner 2: The local mobile edge platform sends a query packet to all mobile edge platforms, where the query packet includes the service identifier, and queries, based on the query packet, the source mobile edge platform on which the service corresponding to the service identifier is located.

Correspondingly, the source mobile edge platform receives the subscription request sent by the local mobile edge platform.

Operation 305: The source mobile edge platform sends service information to the local mobile edge platform, where the service information includes the service identifier and the source temporary service endpoint.

After receiving the subscription request sent by the local mobile edge platform, the source mobile edge platform sends the service information of the service to the local mobile edge platform that subscribes to the service. The service information includes the service identifier and the source temporary service endpoint of the subscribed service.

Correspondingly, the local mobile edge platform receives the service information sent by the source mobile edge platform.

Operation 306: The local mobile edge platform establishes a service mapping table, to map the source temporary service endpoint to a local temporary service endpoint.

After receiving the service information, the local mobile edge platform establishes the service mapping table, to map, in the service mapping table, the source temporary service endpoint to the local temporary service endpoint based on the source temporary service endpoint and an IP address of the local mobile edge platform. A process in which the local mobile edge platform maps the source temporary service endpoint to the local temporary service endpoint is similar to the process in which the source mobile edge platform maps the service endpoint to the source temporary service endpoint. For a detailed process, refer to the process in which the source mobile edge platform maps the service endpoint to the source temporary service endpoint.

After receiving the service identifier and the source temporary service endpoint sent by the source mobile edge platform, the local mobile edge platform establishes the service mapping table, to map the source temporary service endpoint (S-SB-endpoint) to the local temporary service endpoint (L-SB-endpoint). The service mapping table includes the source temporary service endpoint and the local temporary service endpoint, and the service mapping table is used to map the source temporary service endpoint to the corresponding local temporary service endpoint.

Based on the three source temporary service endpoints shown in Table 2, Table 3 shows an example of a mapping relationship between a source temporary service endpoint and a local temporary service endpoint.

TABLE 3

| S-SB-endpoint 1 | L-SB-endpoint 1 |
| S-SB-endpoint 2 | L-SB-endpoint 2 |
| S-SB-endpoint 3 | L-SB-endpoint 3 |

The source temporary service endpoint is an access address used when the service provider provides the service by using the source mobile edge platform, and the local temporary service endpoint is an access address used when the service provider provides the service by using the local mobile edge platform.

Operation 307: The local mobile edge platform sends local service information to the service consumer, where the local service information includes the service identifier and the local temporary service endpoint.

The local mobile edge platform sends the local service information to the service consumer using the service, so that the service consumer accesses the subscribed service based on the local temporary service endpoint.

Correspondingly, the service consumer receives the local service information sent by the local mobile edge platform.

When the source mobile edge platform cannot meet a performance requirement required by the service provider, or the service provider cannot meet a service quality requirement, or the service provider cannot response to a load balance request, the service needs to be migrated from the source mobile edge platform to a target mobile edge platform. A migration process is shown in the following operation 308 to operation 316.

Operation 308: The source mobile edge platform sends a service migration request to the target mobile edge platform, where the service migration request includes the service identifier and the service endpoint.

The service migration request is used to request to migrate the service provided by the service provider, the service migration request includes the service identifier of the service and the service endpoint corresponding to the service identifier, and the service identifier is used to identify the service in at least one service.

There are two optional manners to determine whether the service needs to be migrated, and there also include two manners that cause the source mobile edge platform to send the service migration request to the target mobile edge platform. Details are as follows.

Manner 1: The source mobile edge platform detects whether the service needs to be migrated, and sends the service migration request to the target mobile edge platform when the service needs to be migrated; or if the service does not need to be migrated, the source mobile edge platform does not send the service migration request to the target mobile edge platform.

Manner 2: The service provider detects whether the service needs to be migrated, and sends a migration request to the source mobile edge platform when the service needs to be migrated, and the source mobile edge platform sends the service migration request to the target mobile edge platform after receiving the migration request sent by the service provider; or when the service does not need to be migrated, the service provider does not send a migration request to the source mobile edge platform.

It should be noted that, the target mobile edge platform may be determined by using a performance requirement and a load balance status that are provided. Determining of the target mobile edge platform is not limited in this embodiment of the present application.

Correspondingly, the target mobile edge platform receives the service migration request sent by the source mobile edge platform.

Operation 309: The target mobile edge platform establishes a service mapping table, to map the service endpoint to a target temporary service endpoint.

After receiving the service migration request, the target mobile edge platform obtains the service identifier and the service endpoint in the service migration request, to establish the service mapping table, and generates the target temporary service endpoint (T-SB-endpoint) based on the obtained service endpoint (S-endpoint) and an IP address of the target mobile edge platform. The service mapping table includes the service endpoint and the target temporary service endpoint, and the service mapping table is used to map the service endpoint to the corresponding target temporary service endpoint. The target temporary service endpoint is an access address used when the service provider provides the service by using the target mobile edge platform.

Based on the service endpoints that are corresponding to the three services provided by the service provider and that are shown in Table 1, Table 4 shows an example of a mapping relationship between a service endpoint and a target temporary service endpoint.

TABLE 4

| S-endpoint 1 | T-SB-endpoint 1 |
| S-endpoint 2 | T-SB-endpoint 2 |
| S-endpoint 3 | T-SB-endpoint 3 |

The service endpoint is an access address used when the service provider provides the service. The target temporary service endpoint is an access address used to access the service registered with the target mobile edge platform, and the target temporary service endpoint includes the IP address of the target mobile edge platform.

A process in which the target mobile edge platform maps the service endpoint to the target temporary service endpoint is similar to the process in which the source mobile edge platform maps the service endpoint to the source temporary service endpoint. For a detailed process, refer to the process in which the source mobile edge platform maps the service endpoint to the source temporary service endpoint.

Operation 310: The target mobile edge platform sends a service migration response to the source mobile edge platform.

After mapping the service endpoint to the target temporary service endpoint, the target mobile edge platform sends the service migration response to the source mobile edge platform. The service migration response is used to notify the source mobile edge platform that service migration is completed.

Correspondingly, the source mobile edge platform receives the service migration response sent by the target mobile edge platform.

Operation 311: The source mobile edge platform sends service migration information to the local mobile edge platform, where the service migration information includes the service identifier and an IP address of the target mobile edge platform.

After receiving the service migration response sent by the target mobile edge platform, the source mobile edge platform sends the service migration information to the local mobile edge platform that subscribes to the service. The service migration information includes the service identifier and the IP address of the target mobile edge platform. The service migration information is used to notify the local mobile edge platform that subscribes to the service that the service is migrated, and notify the local mobile edge platform of the IP address of the target mobile edge platform.

Correspondingly, the local mobile edge platform receives the service migration information sent by the source mobile edge platform.

Operation 312: The local mobile edge platform sends a subscription cancellation request to the source mobile edge platform, where the subscription cancellation request includes the service identifier.

The subscription cancellation request is used to cancel the subscribed service on the source mobile edge platform.

After receiving the service migration information sent by the source mobile edge platform, the local mobile edge platform sends the subscription cancellation request to the source mobile edge platform. The subscription cancellation request is used to cancel the service to which the local mobile edge platform subscribes on the source mobile edge platform.

Correspondingly, the source mobile edge platform receives the subscription cancellation request sent by the local mobile edge platform.

Operation 313: The local mobile edge platform sends a subscription request to the target mobile edge platform, where the subscription request includes the service identifier.

After cancelling the subscribed service on the source mobile edge platform, the local mobile edge platform sends the subscription request to the target mobile edge platform. The subscription request is used to request to subscribe to the service on the target mobile edge platform.

Correspondingly, the target mobile edge platform receives the subscription request sent by the local mobile edge platform.

Operation 314: The target mobile edge platform sends service information to the local mobile edge platform, where the service information includes the service identifier and the target temporary service endpoint.

After receiving the subscription request sent by the local mobile edge platform, the target mobile edge platform sends the service information to the local mobile edge platform that subscribes to the service. The service information includes the service identifier and the target temporary service endpoint.

Correspondingly, the local mobile edge platform receives the service information sent by the target mobile edge platform.

Operation 315: The local mobile edge platform updates the service mapping table, to update the source temporary service endpoint having a mapping relationship with the local temporary service endpoint to the target temporary service endpoint.

After receiving the service information sent by the target mobile edge platform, the local mobile edge platform updates the service mapping table, to update, to the target temporary service endpoint (T-SB-endpoint), the source temporary service endpoint (S-SB-endpoint) that is in the service mapping table and that has a mapping relationship with the local temporary service endpoint. The local mobile edge platform deletes the mapping relationship between the source temporary service endpoint and the local temporary service endpoint, and establishes a mapping relationship between the local temporary service endpoint and the target temporary service endpoint. The service mapping table includes the target temporary service endpoint and the local temporary service endpoint, and the service mapping table is used to map the target temporary service endpoint to the corresponding to the local temporary service endpoint.

Based on the three target temporary service endpoints shown in Table 3, Table 5 shows an example of a mapping relationship between a target temporary service endpoint and a local temporary service endpoint.

TABLE 5

| T-SB-endpoint 1 | L-SB-endpoint 4 |
| T-SB-endpoint 2 | L-SB-endpoint 5 |
| T-SB-endpoint 3 | L-SB-endpoint 6 |

The local temporary service endpoint is an access address used when the service consumer on the local mobile edge platform accesses the service on the target mobile edge platform.

Operation 316: The local mobile edge platform sends local service information to the service consumer, where the local service information includes the service identifier and the local temporary service endpoint.

The local mobile edge platform sends the local service information to the service consumer after updating the service mapping table. The local service information includes the service identifier and the local temporary service endpoint, and there is a mapping relationship between the local temporary service endpoint and the target temporary service endpoint.

For example, if the local mobile edge platform includes the L-SB-endpoint 6 in the local service information, and sends the local service information to the service consumer, the service consumer accesses a subscribed service 1 based on the L-SB-endpoint 6.

Correspondingly, the service consumer using the service receives the local service information sent by the local mobile edge platform, and accesses the subscribed service by using the local temporary service endpoint carried in the local service information.

In conclusion, according to the service migration method provided in this embodiment, the local mobile edge platform subscribes to the service on the source mobile edge platform. When the service is migrated, the source mobile edge platform sends the service migration information to the local mobile edge platform that subscribes to the service, so that the local mobile edge platform that subscribes to the service cancels the subscribed service on the source mobile edge platform, re-subscribes to the service on the target mobile edge platform, and establishes a mapping table and a route update policy, to route service-related data to the target temporary service endpoint. In this way, a problem of migrating the service provider from the source mobile edge platform to the target mobile edge platform is resolved, and it can be ensured that after the service provider is migrated from the source mobile edge platform to the target mobile edge platform, the service consumer that subscribes to the service on the source mobile edge platform can continue to correctly use the service migrated to the target mobile edge platform, so as to ensure availability and reliability of a service provided by the service consumer for user equipment.

It should be noted that, in this embodiment of the present application, the service endpoint obtained by the target mobile edge platform from the service migration request sent by the source mobile edge platform remains unchanged after the service is migrated.

It should be further noted that, in this embodiment of the present application, an example in which the service consumer using the service is located in a local mobile edge server is used for description. In an actual implementation process, the service consumer using the service may be located in a source mobile edge server, or may be located in a target mobile edge server. When the service consumer using the service is located in the source mobile edge server, the source mobile edge server and the local mobile edge server are a same server; or when the service consumer using the service is located in the target mobile edge server, the target mobile edge server and the local mobile edge server are a same server.

In this embodiment, the source mobile edge server may include a source service provider and the source mobile edge platform, the target mobile edge server may include a target service provider and the target mobile edge platform, and the local mobile edge server may include the local mobile edge platform and the service consumer. The target service provider is the source service provider migrated to the target mobile edge platform.

Referring to FIG. 4A, FIG. 4B, FIG. 4C, and FIG. 4D, FIG. 4A, FIG. 4B, FIG. 4C, and FIG. 4D are a flowchart of a service migration method according to another example embodiment of the present application. This embodiment is described by using an example in which the method is applied to the implementation environment shown in FIG. 1B. The service migration method includes the following operations.

Operation 401 to operation 407 are a process in which a service provider registers a service with a source mobile edge platform, and a service consumer on a local mobile edge platform uses the registered service.

Operation 401: The source service provider registers a service with the source mobile edge platform.

In a registration process, the source service provider provides a service identifier (Service ID) and a service endpoint (S-endpoint) to the source mobile edge platform.

For example, when the source service provider registers the service with the source mobile edge platform, the service identifier is a service ID 1 and the service endpoint is an S-endpoint 11.

The source service provider is an application providing a service in a source mobile edge server, and the service endpoint is an access address of the service.

Correspondingly, the source mobile edge platform receives the service identifier and the service endpoint provided by the source service provider.

Operation 402: The source mobile edge platform establishes a service mapping table, to map a service endpoint to a source temporary service endpoint.

After receiving the service identifier and the service endpoint provided by the source service provider, the source mobile edge platform establishes the service mapping table, to map the service endpoint (S-endpoint) provided by the source service provider to the source temporary service endpoint (S-SB-endpoint). The service mapping table includes the service endpoint and the source temporary service endpoint, and the service mapping table is used to map the service endpoint to the corresponding source temporary service endpoint. The source temporary service endpoint includes an IP address of the source mobile edge platform.

Optionally, the source temporary service endpoint is an access address used when the service provider provides the service by using the source mobile edge platform.

Operation 403: The service consumer sends a subscription request to the local mobile edge platform, where the subscription request includes a service identifier.

The service consumer (Service Consumer) is an application using the service.

Correspondingly, the local mobile edge platform receives the subscription request sent by the service consumer.

Operation 404: The local mobile edge platform sends a subscription request to the source mobile edge platform, where the subscription request includes the service identifier.

After receiving the subscription request sent by the service consumer, the local mobile edge platform obtains the service identifier included in the subscription request. The local mobile edge platform queries, based on the service identifier, the source mobile edge platform on which the corresponding service is located.

The local mobile edge platform queries the source mobile edge platform based on the service identifier in two manners:

Manner 1: The local mobile edge platform queries, from a management node based on the service identifier, the source mobile edge platform on which the service corresponding to the service identifier is located.

Manner 2: The local mobile edge platform sends a query packet to all mobile edge platforms, where the query packet includes the service identifier, and queries, based on the query packet, the source mobile edge platform on which the service corresponding to the service identifier is located.

Correspondingly, the source mobile edge platform receives the subscription request sent by the local mobile edge platform.

Operation 405: The source mobile edge platform sends service information to the local mobile edge platform, where the service information includes the service identifier and the source temporary service endpoint.

After receiving the subscription request sent by the local mobile edge platform, the source mobile edge platform sends the service information of the service to the local mobile edge platform that subscribes to the service. The service information includes the service identifier and the source temporary service endpoint of the subscribed service.

Correspondingly, the local mobile edge platform receives the service information sent by the source mobile edge platform.

Operation 406: The local mobile edge platform establishes a service mapping table, to map the source temporary service endpoint to a local temporary service endpoint.

After receiving the service information, the local mobile edge platform establishes the service mapping table, to map, in the service mapping table, the source temporary service endpoint to the local temporary service endpoint. The local temporary service endpoint includes an IP address of the local mobile edge platform.

Operation 407: The local mobile edge platform sends local service information to the service consumer, where the local service information includes the service identifier and the local temporary service endpoint.

The local mobile edge platform sends the local service information to the local service consumer, so that the service consumer accesses the subscribed service based on the local temporary service endpoint.

Correspondingly, the service consumer receives the local service information sent by the local mobile edge platform.

Operation 401 to operation 407 in this embodiment are the same as operation 301 to operation 307 shown in the embodiment in FIG. 3A and FIG. 3B. For detailed descriptions, refer to operation 301 to operation 307 shown in the embodiment in FIG. 3A and FIG. 3B.

When the source mobile edge platform cannot meet a performance requirement required by the service provider, or the service provider cannot meet a service quality requirement, or the service provider cannot response to a load balance request, the service needs to be migrated from the source mobile edge platform to a target mobile edge platform. A migration process is shown in the following operation 408 to operation 418.

Operation 408: The source mobile edge platform sends a service migration request to the target mobile edge platform, where the service migration request includes the service identifier.

The service migration request is used to request to migrate the service provided by the service provider.

Optionally, the service migration request further includes an identifier of the service consumer using the service.

There are two optional manners to determine whether the service needs to be migrated, and there also include two manners that cause the source mobile edge platform to send the service migration request to the target mobile edge platform. Details are as follows.

Manner 1: The source mobile edge platform detects whether the service needs to be migrated, and sends the service migration request to the target mobile edge platform when the service needs to be migrated; or if the service does not need to be migrated, the source mobile edge platform does not send the service migration request to the target mobile edge platform.

Manner 2: The source service provider detects whether the service needs to be migrated, and sends a migration request to the source mobile edge platform when the service needs to be migrated, and the source mobile edge platform sends the service migration request to the target mobile edge platform after receiving the migration request sent by the service provider; or when the service does not need to be migrated, the source service provider does not send a migration request to the source mobile edge platform.

It should be noted that, the target mobile edge platform may be determined by using a performance requirement and a load balance status that are provided. Determining of the target mobile edge platform is not limited in this embodiment of the present application.

Correspondingly, the target mobile edge platform receives the service migration request sent by the source mobile edge platform.

Operation 409: The target mobile edge platform sends a re-registration indication to a target service provider, where the re-registration indication includes the service identifier.

After receiving the service migration request sent by the source mobile edge platform, the target mobile edge platform sends the re-registration indication to the target service provider.

It should be noted that, the service provider is referred to as the source service provider on the source mobile edge platform, and is referred to as the target service provider on the target mobile edge platform. In this embodiment, the target service provider and the source service provider are a same service provider. The target service provider is the source service provider migrated from the source mobile edge platform to the target mobile edge platform.

Correspondingly, the target service provider receives the re-registration indication sent by the target mobile edge platform.

Operation 410: The target service provider sends a registration request to the target mobile edge platform, where the registration request includes the service identifier and the service endpoint.

The registration request sent by the target service provider to the target mobile edge platform includes the service identifier and the service endpoint corresponding to the service identifier.

For example, the registration request sent by the target service provider to the target mobile edge platform includes a service identifier service ID 1 and a service endpoint S-endpoint 12 corresponding to the service identifier.

The target mobile edge platform obtains the service identifier service ID 1 and the service endpoint S-endpoint 12 in the registration request.

Compared with operation 401, it may be learned that a service endpoint is the S-endpoint 11 when a service corresponding to the service identifier service ID 1 is registered with the source mobile edge platform, and the service endpoint is the S-endpoint 12 when the service is registered with the target mobile edge platform.

Therefore, the service endpoint carried in the registration request sent by the target service provider to the target mobile edge platform is changed compared with the service endpoint provided when the service is registered with the source mobile edge platform.

Optionally, the service endpoint provided when the service is registered with the source mobile edge platform and the service endpoint provided when the service is registered with the target mobile edge platform remain unchanged.

Optionally, the target service provider directly sends the registration request to the target mobile edge platform. The registration request includes the service identifier and the service endpoint.

Correspondingly, the target mobile edge platform receives the registration request sent by the target service provider.

Operation 411: The target mobile edge platform establishes a service mapping table, to map the service endpoint to a target temporary service endpoint.

After receiving the service migration request, the target mobile edge platform obtains the service identifier and the service endpoint in the service migration request, to establish the service mapping table, and generates the target temporary service endpoint (T-SB-endpoint) based on the obtained service endpoint (S-endpoint) and an IP address of the target mobile edge platform. The service mapping table includes the service endpoint and the target temporary service endpoint, and the service mapping table is used to map the service endpoint to the corresponding target temporary service endpoint.

The service endpoint is an access address used when the service provider provides the service. The target temporary service endpoint is an access address used to access the service registered with the target mobile edge platform, and the target temporary service endpoint includes the IP address of the target mobile edge platform.

Operation 412: The target mobile edge platform sends a service migration response to the source mobile edge platform.

After mapping the service endpoint to the target temporary service endpoint, the target mobile edge platform sends the service migration response to the source mobile edge platform. The service migration response is used to notify the source mobile edge platform that service migration is completed.

Correspondingly, the source mobile edge platform receives the service migration response sent by the target mobile edge platform.

Operation 413: The source mobile edge platform sends service migration information to the local mobile edge platform, where the service migration information includes the service identifier and an IP address of the target mobile edge platform.

After receiving the service migration response sent by the target mobile edge platform, the source mobile edge platform sends the service migration information to the local mobile edge platform that subscribes to the service. The service migration information includes the service identifier and the IP address of the target mobile edge platform. The service migration information is used to notify the local mobile edge platform that subscribes to the service that the service is migrated, and notify the local mobile edge platform of the IP address of the target mobile edge platform.

Correspondingly, the local mobile edge platform receives the service migration information sent by the source mobile edge platform.

Operation 414: The local mobile edge platform sends a subscription cancellation request to the source mobile edge platform, where the subscription cancellation request includes the service identifier.

The subscription cancellation request is used to cancel the subscribed service on the source mobile edge platform.

After receiving the service migration information sent by the source mobile edge platform, the local mobile edge platform sends the subscription cancellation request to the source mobile edge platform. The subscription cancellation request is used to cancel the service to which the local mobile edge platform subscribes on the source mobile edge platform.

Correspondingly, the source mobile edge platform receives the subscription cancellation request sent by the local mobile edge platform.

Operation 415: The local mobile edge platform sends a subscription request to the target mobile edge platform, where the subscription request includes the service identifier.

After cancelling the subscribed service on the source mobile edge platform, the local mobile edge platform sends the subscription request to the target mobile edge platform. The subscription request is used to request to subscribe to the service on the target mobile edge platform.

Correspondingly, the target mobile edge platform receives the subscription request sent by the local mobile edge platform.

Operation 416: The target mobile edge platform sends service information to the local mobile edge platform, where the service information includes the service identifier and the target temporary service endpoint.

After receiving the subscription request sent by the local mobile edge platform, the target mobile edge platform sends the service information to the local mobile edge platform that subscribes to the service. The service information includes the service identifier and the target temporary service endpoint.

Correspondingly, the local mobile edge platform receives the service information sent by the target mobile edge platform.

Operation 417: The local mobile edge platform updates the service mapping table, to update the source temporary service endpoint having a mapping relationship with the local temporary service endpoint to the target temporary service endpoint.

After receiving the service information sent by the target mobile edge platform, the local mobile edge platform updates the service mapping table, to update, to the target temporary service endpoint (T-SB-endpoint), the source temporary service endpoint (S-SB-endpoint) that is in the service mapping table and that has a mapping relationship with the local temporary service endpoint. The local mobile edge platform deletes the mapping relationship between the source temporary service endpoint and the local temporary service endpoint, and establishes a mapping relationship between the local temporary service endpoint and the target temporary service endpoint. The service mapping table includes the target temporary service endpoint and the local temporary service endpoint, and the service mapping table is used to map the target temporary service endpoint to the corresponding to the local temporary service endpoint.

The local temporary service endpoint is an access address used when the service consumer on the local mobile edge platform accesses the service on the target mobile edge platform.

Operation 418: The local mobile edge platform sends local service information to the service consumer, where the local service information includes the service identifier and the local temporary service endpoint.

The local mobile edge platform sends the local service information to the service consumer after updating the service mapping table. The local service information includes the service identifier and the local temporary service endpoint, and there is a mapping relationship between the local temporary service endpoint and the target temporary service endpoint.

Correspondingly, the service consumer receives the local service information sent by the local mobile edge platform, and accesses the subscribed service by using the local temporary service endpoint carried in the local service information.

Operation 411 to operation 418 in this embodiment are the same as operation 309 to operation 316 shown in the embodiment in FIG. 3B and FIG. 3C. For detailed descriptions, refer to operation 309 to operation 316 shown in the embodiment in FIG. 3B and FIG. 3C.

In conclusion, according to the service migration method provided in this embodiment, the local mobile edge platform subscribes to the service on the source mobile edge platform. When the service is migrated, the source mobile edge platform sends the service migration information to the local mobile edge platform that subscribes to the service, so that the local mobile edge platform that subscribes to the service cancels the subscribed service on the source mobile edge platform, re-subscribes to the service on the target mobile edge platform, re-registers the service provider with the target mobile edge platform, and establishes a mapping table and a route update policy by using the target mobile edge platform, to route service-related data to the target temporary service endpoint. In this way, a problem of migrating the service provider from the source mobile edge platform to the target mobile edge platform is resolved, and it can be ensured that after the service provider is migrated from the source mobile edge platform to the target mobile edge platform, the service consumer that subscribes to the service on the source mobile edge platform can continue to correctly use the service migrated to the target mobile edge platform, so as to ensure availability and reliability of a service provided by the service consumer for user equipment.

Different from the embodiment shown in FIG. 3A, FIG. 3B, and FIG. 3C, in this embodiment, after the source mobile edge platform sends the service migration request to the target mobile edge platform, the target service provider sends the registration request to the target mobile edge platform, and the registration request includes the service identifier and the service endpoint. The service endpoint carried in the registration request sent by the target service provider to the target mobile edge platform and the service endpoint provided when the service is registered with the source mobile edge platform may change or may remain unchanged.

In this embodiment, a source mobile edge server may include the service provider and the source mobile edge platform, a target mobile edge server may include the target mobile edge platform, and a local mobile edge server may include the local mobile edge platform and the service consumer.

Figure 5A:
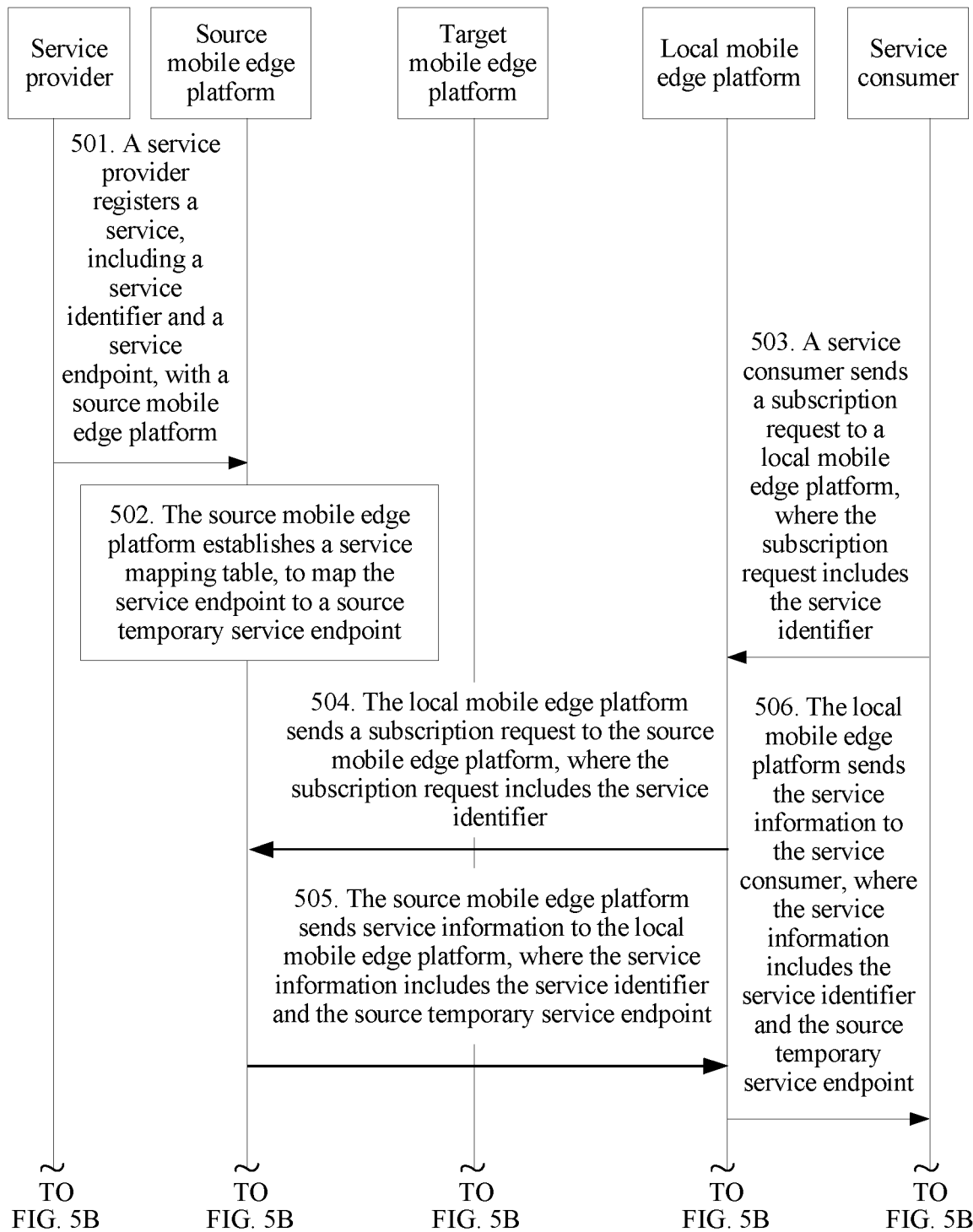
FIG. 5A, FIG. 5B, and FIG. 5C are a flowchart of a service migration method according to another example embodiment of the present application.
Figure 5B:
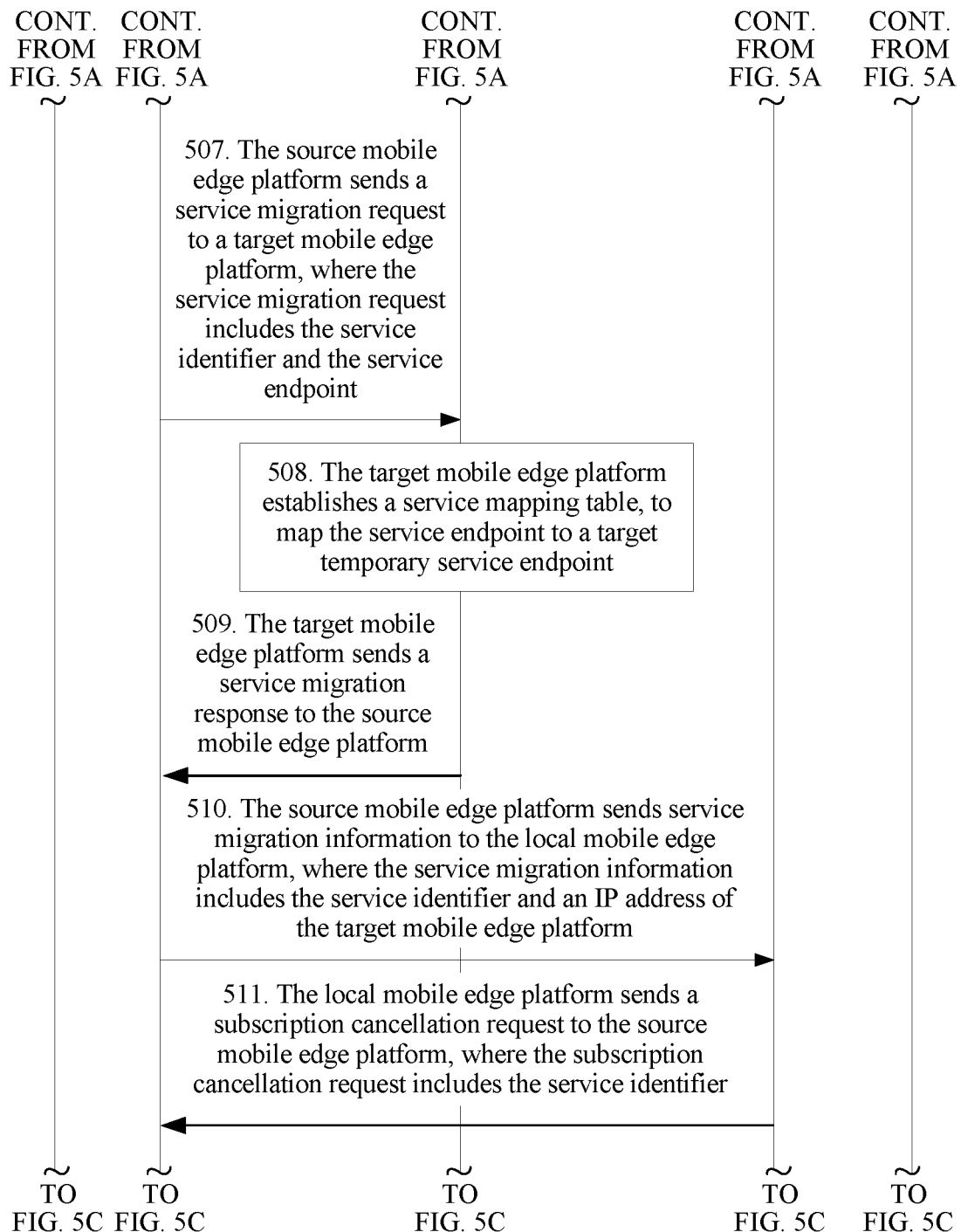
Figure 5C:
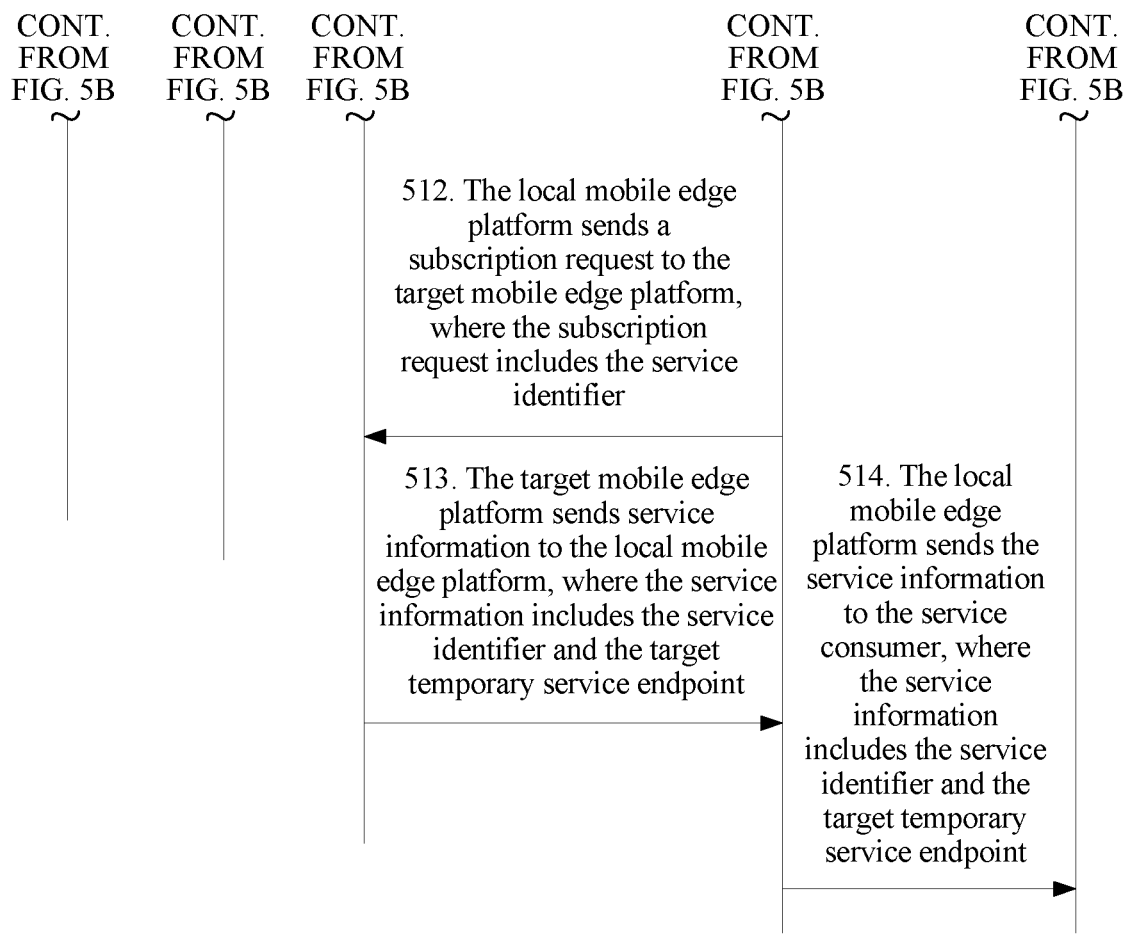

Referring to FIG. 5A, FIG. 5B, and FIG. 5C, FIG. 5A, FIG. 5B, and FIG. 5C are a flowchart of a service migration method according to still another example embodiment of the present application. This embodiment is described by using an example in which the method is applied to the implementation environment shown in FIG. 1B. The service migration method includes the following operations.

Operation 501 to operation 506 are a process in which a service provider registers a service with a source mobile edge platform, and a service consumer on a local mobile edge platform uses the registered service.

Operation 501: The service provider registers a service with the source mobile edge platform.

In a registration process, the service provider provides a service identifier (Service ID) and a service endpoint (S-endpoint) to the source mobile edge platform.

The service provider is an application providing a service, and the service endpoint is an access address of the service.

Correspondingly, the source mobile edge platform receives the service identifier and the service endpoint provided by the service provider.

Operation 502: The source mobile edge platform establishes a service mapping table, to map a service endpoint to a source temporary service endpoint.

After receiving the service identifier and the service endpoint provided by the service provider, the source mobile edge platform establishes the service mapping table, to map the service endpoint (S-endpoint) provided by the service provider to the source temporary service endpoint (S-SB-endpoint). The service mapping table includes the service endpoint and the source temporary service endpoint, and the service mapping table is used to map the service endpoint to the corresponding source temporary service endpoint. The source temporary service endpoint includes an IP address of the source mobile edge platform.

Optionally, the source temporary service endpoint is a service address registered by the service provider with the source mobile edge platform.

Operation 503: The service consumer sends a subscription request to the local mobile edge platform, where the subscription request includes a service identifier.

The service consumer is an application using the service.

Correspondingly, the local mobile edge platform receives the subscription request sent by the service consumer.

Operation 504: The local mobile edge platform sends a subscription request to the source mobile edge platform, where the subscription request includes the service identifier.

After receiving the subscription request sent by the service consumer, the local mobile edge platform obtains the service identifier included in the subscription request. The local mobile edge platform queries, based on the service identifier, the source mobile edge platform on which the corresponding service is located.

The local mobile edge platform queries the source mobile edge platform based on the service identifier in two manners:

Manner 1: The local mobile edge platform queries, from a management node based on the service identifier, the source mobile edge platform on which the service corresponding to the service identifier is located.

Manner 2: The local mobile edge platform sends a query packet to all mobile edge platforms, where the query packet includes the service identifier, and queries, based on the query packet, the source mobile edge platform on which the service corresponding to the service identifier is located.

Correspondingly, the source mobile edge platform receives the subscription request sent by the local mobile edge platform.

Operation 505: The source mobile edge platform sends service information to the local mobile edge platform, where the service information includes the service identifier and the source temporary service endpoint.

After receiving the subscription request sent by the local mobile edge platform, the source mobile edge platform sends the service information of the service to the local mobile edge platform that subscribes to the service. The service information includes the service identifier and the source temporary service endpoint of the subscribed service.

Correspondingly, the local mobile edge platform receives the service information sent by the source mobile edge platform.

Operation 501 to operation 505 in this embodiment are the same as operation 301 to operation 305 shown in the embodiment in FIG. 3A. For detailed descriptions, refer to operation 301 to operation 305 shown in the embodiment in FIG. 3A.

Operation 506: The local mobile edge platform sends the service information to the service consumer, where the service information includes the service identifier and the source temporary service endpoint.

The local mobile edge platform forwards the received service information to the service consumer, so that the service consumer accesses the subscribed service based on the source temporary service endpoint.

Correspondingly, the service consumer receives the service information sent by the local mobile edge platform.

When the source mobile edge platform cannot meet a performance requirement required by the service provider, or the service provider cannot meet a service quality requirement, or the service provider cannot response to a load balance request, the service needs to be migrated from the source mobile edge platform to a target mobile edge platform. A migration process is shown in the following operation 507 to operation 514.

Operation 507: The source mobile edge platform sends a service migration request to the target mobile edge platform, where the service migration request includes the service identifier and the service endpoint.

The service migration request is used to request to migrate the service provided by the service provider.

There are two optional manners to determine whether the service needs to be migrated, and there also include two manners that cause the source mobile edge platform to send the service migration request to the target mobile edge platform. Details are as follows.

Manner 1: The source mobile edge platform detects whether the service needs to be migrated, and sends the service migration request to the target mobile edge platform when the service needs to be migrated; or if the service does not need to be migrated, the source mobile edge platform does not send the service migration request to the target mobile edge platform.

Manner 2: The service provider detects whether the service needs to be migrated, and sends a migration request to the source mobile edge platform when the service needs to be migrated, and the source mobile edge platform sends the service migration request to the target mobile edge platform after receiving the migration request sent by the service provider; or when the service does not need to be migrated, the service provider does not send a migration request to the source mobile edge platform.

It should be noted that, the target mobile edge platform may be determined by using a performance requirement and a load balance status that are provided. Determining of the target mobile edge platform is not limited in this embodiment of the present application.

Correspondingly, the target mobile edge platform receives the service migration request sent by the source mobile edge platform.

Operation 508: The target mobile edge platform establishes a service mapping table, to map the service endpoint to a target temporary service endpoint.

After receiving the service migration request, the target mobile edge platform obtains the service identifier and the service endpoint in the service migration request, to establish the service mapping table, and generates the target temporary service endpoint (T-SB-endpoint) based on the obtained service endpoint (S-endpoint) and an IP address of the target mobile edge platform. The service mapping table includes the service endpoint and the target temporary service endpoint, and the service mapping table is used to map the service endpoint to the corresponding target temporary service endpoint. The target temporary service endpoint includes the IP address of the target mobile edge platform.

The service endpoint is an access address used when the service provider provides the service. The target temporary service endpoint is an access address used to access the service registered with the target mobile edge platform, and the target temporary service endpoint includes the IP address of the target mobile edge platform.

Operation 509: The target mobile edge platform sends a service migration response to the source mobile edge platform.

After mapping the service endpoint to the target temporary service endpoint, the target mobile edge platform sends the service migration response to the source mobile edge platform. The service migration response is used to notify the source mobile edge platform that service migration is completed.

Correspondingly, the source mobile edge platform receives the service migration response sent by the target mobile edge platform.

Operation 510: The source mobile edge platform sends service migration information to the local mobile edge platform, where the service migration information includes the service identifier and an IP address of the target mobile edge platform.

After receiving the service migration response sent by the target mobile edge platform, the source mobile edge platform sends the service migration information to the local mobile edge platform that subscribes to the service. The service migration information includes the service identifier and the IP address of the target mobile edge platform. The service migration information is used to notify the local mobile edge platform that subscribes to the service that the service is migrated, and notify the local mobile edge platform of the IP address of the target mobile edge platform.

Correspondingly, the local mobile edge platform receives the service migration information sent by the source mobile edge platform.

Operation 511: The local mobile edge platform sends a subscription cancellation request to the source mobile edge platform, where the subscription cancellation request includes the service identifier.

The subscription cancellation request is used to cancel the subscribed service on the source mobile edge platform.

After receiving the service migration information sent by the source mobile edge platform, the local mobile edge platform sends the subscription cancellation request to the source mobile edge platform. The subscription cancellation request is used to cancel the service to which the local mobile edge platform subscribes on the source mobile edge platform.

Correspondingly, the source mobile edge platform receives the subscription cancellation request sent by the local mobile edge platform.

Operation 512: The local mobile edge platform sends a subscription request to the target mobile edge platform, where the subscription request includes the service identifier.

After cancelling the subscribed service on the source mobile edge platform, the local mobile edge platform sends the subscription request to the target mobile edge platform. The subscription request is used to request to subscribe to the service on the target mobile edge platform.

Correspondingly, the target mobile edge platform receives the subscription request sent by the local mobile edge platform.

Operation 513: The target mobile edge platform sends service information to the local mobile edge platform, where the service information includes the service identifier and the target temporary service endpoint.

After receiving the subscription request sent by the local mobile edge platform, the target mobile edge platform sends the service information to the local mobile edge platform that subscribes to the service. The service information includes the service identifier and the target temporary service endpoint.

Correspondingly, the local mobile edge platform receives the service information sent by the target mobile edge platform.

Operation 507 to operation 513 in this embodiment are the same as operation 308 to operation 316 shown in the embodiment in FIG. 3B and FIG. 3C. For detailed descriptions, refer to operation 308 to operation 316 shown in the embodiment in FIG. 3B and FIG. 3C.

Operation 514: The local mobile edge platform sends the service information to the service consumer, where the service information includes the service identifier and the target temporary service endpoint.

The local mobile edge platform forwards the service information to the service consumer after receiving the service information.

Correspondingly, the service consumer receives the service information sent by the local mobile edge platform, and accesses the subscribed service by using the target temporary service endpoint carried in the service information.

In conclusion, according to the service migration method provided in this embodiment, the local mobile edge platform subscribes to the service on the source mobile edge platform. When the service is migrated, the source mobile edge platform sends the service migration information to the local mobile edge platform that subscribes to the service, so that the local mobile edge platform that subscribes to the service cancels the subscribed service on the source mobile edge platform, re-subscribes to the service on the target mobile edge platform, and establishes a mapping table and a route update policy, to route service-related data to the target temporary service endpoint. In this way, a problem of migrating the service provider from the source mobile edge platform to the target mobile edge platform is resolved, and it can be ensured that after the service provider is migrated from the source mobile edge platform to the target mobile edge platform, the service consumer that subscribes to the service on the source mobile edge platform can continue to correctly use the service migrated to the target mobile edge platform, so as to ensure availability and reliability of a service provided by the service consumer for user equipment.

Different from the embodiment shown in FIG. 3A, FIG. 3B, and FIG. 3C, in this embodiment, the local mobile edge platform directly forwards, to the service consumer using the service, the service information sent by the source mobile edge platform; or forwards, to the service consumer using the service, the service information sent by the target mobile edge platform, so that the service consumer using the service directly accesses the service by using a path that is used to access the service and that does not need to pass the local mobile edge platform.

In this embodiment, a source mobile edge server may include the service provider and the source mobile edge platform, a target mobile edge server may include the target mobile edge platform, and a local mobile edge server may include the local mobile edge platform and the service consumer.

Figure 6A:
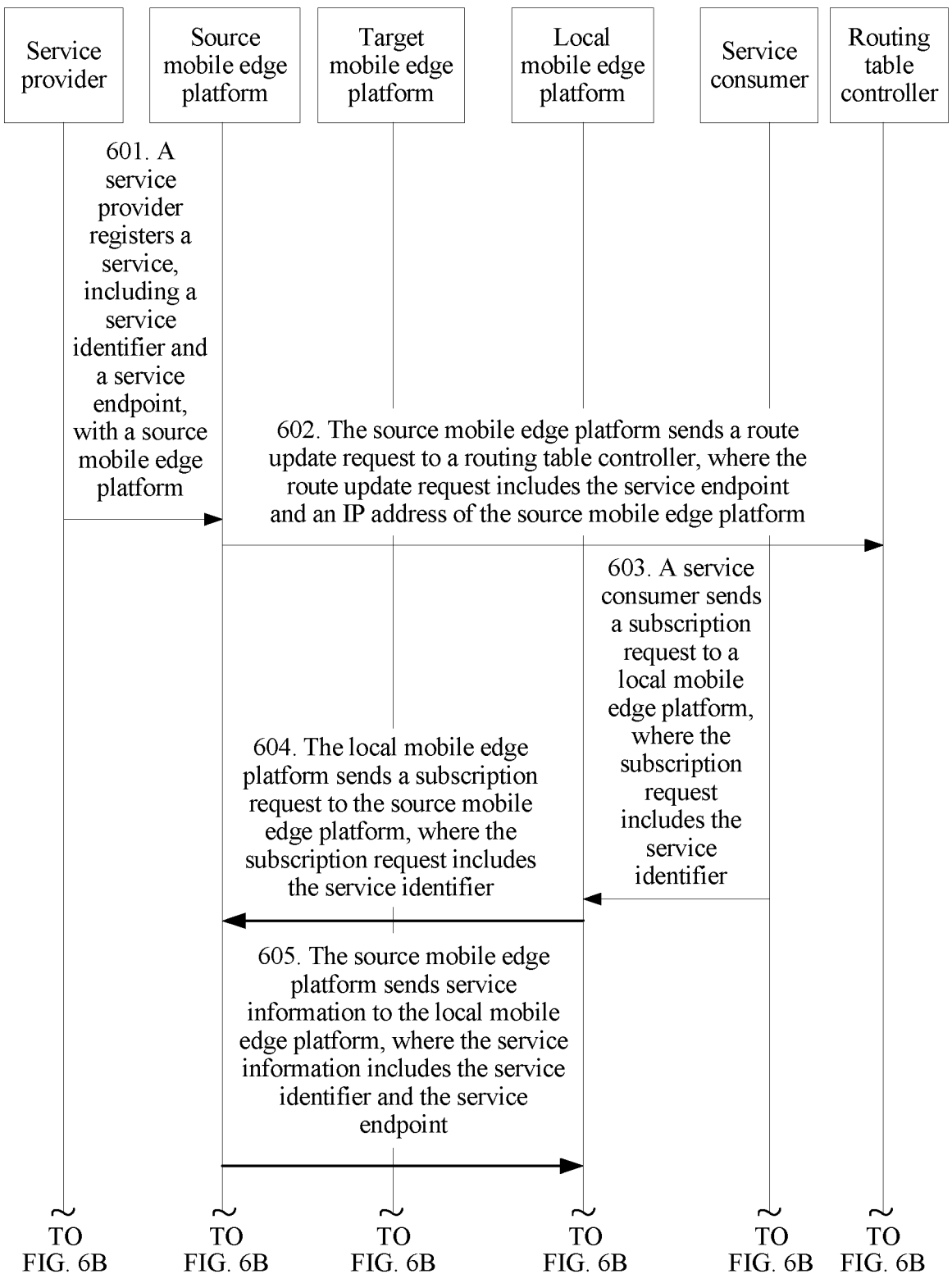
FIG. 6A, FIG. 6B, and FIG. 6C are a flowchart of a service migration method according to another example embodiment of the present application.
Figure 6B:
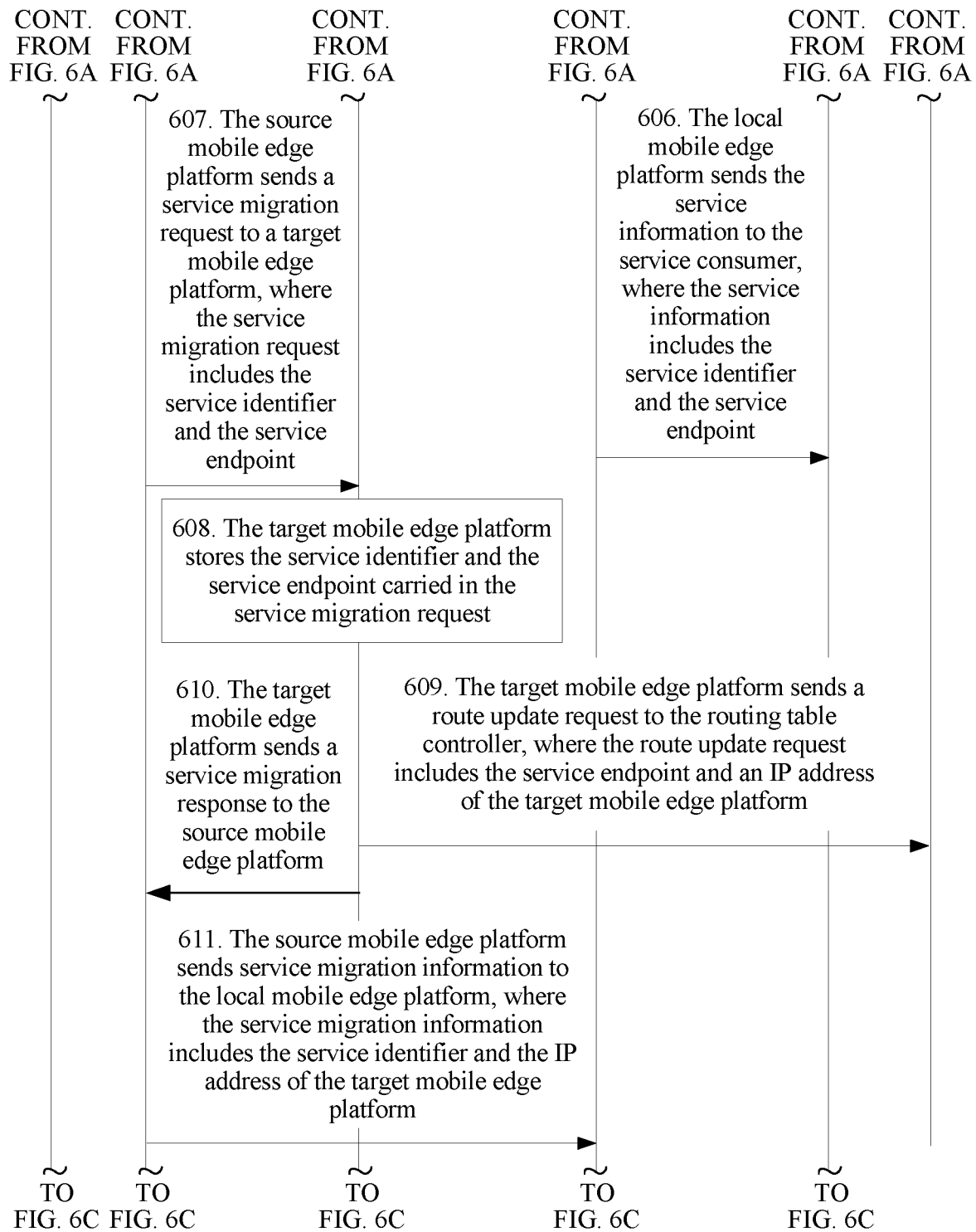
Figure 6C:
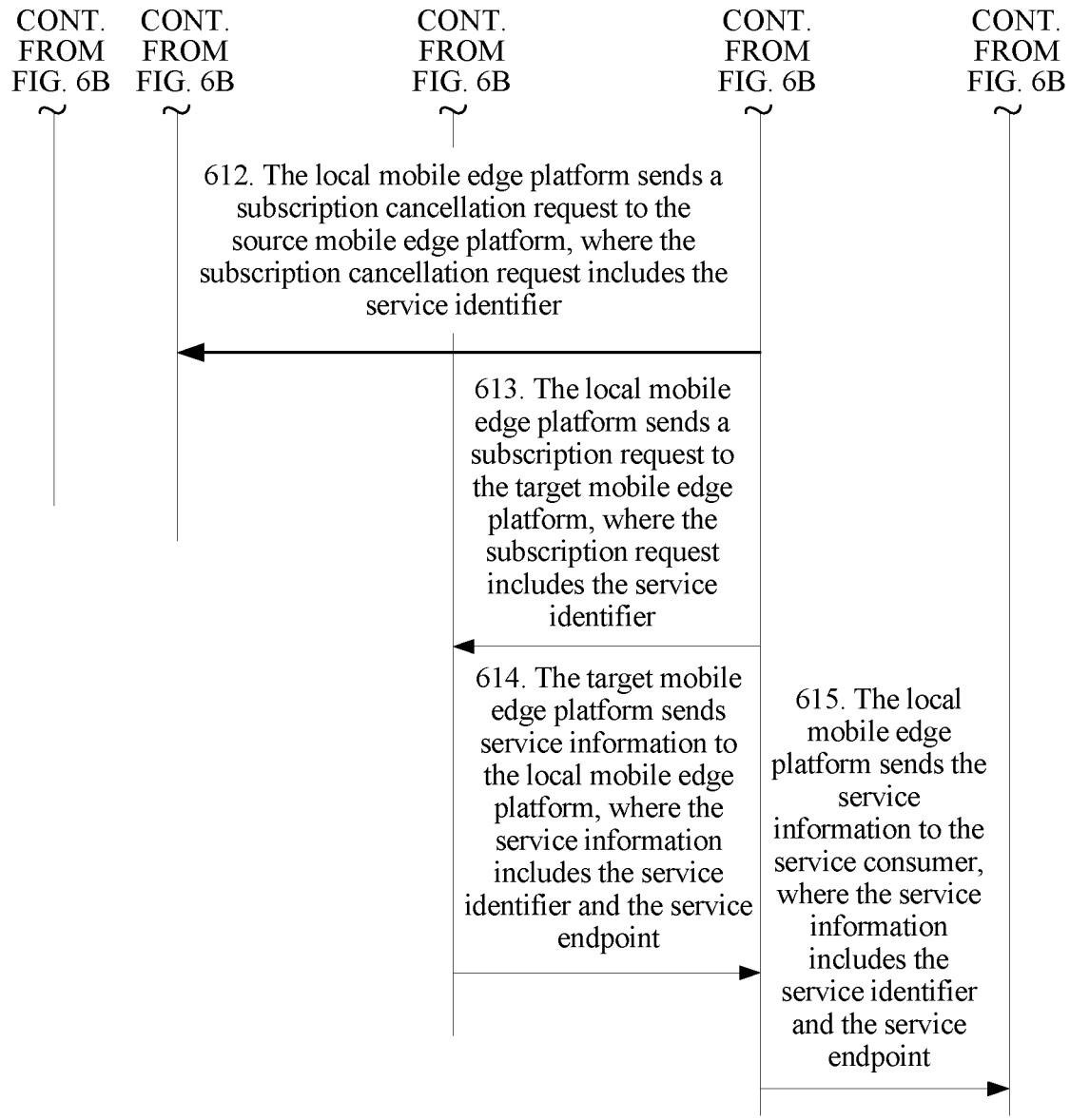

Referring to FIG. 6A, FIG. 6B, and FIG. 6C, FIG. 6A, FIG. 6B, and FIG. 6C are a flowchart of a service migration method according to another example embodiment of the present application. This embodiment is described by using an example in which the method is applied to the implementation environment shown in FIG. 1B. The service migration method includes the following operations.

Operation 601 to operation 606 are a process in which a service provider registers a service with a source mobile edge platform, and a service consumer (Service Consumer) on a local mobile edge platform uses the registered service.

Operation 601: The service provider registers a service with the source mobile edge platform.

In a registration process, the service provider provides a service identifier (Service ID) and a service endpoint (S-endpoint) to the source mobile edge platform.

The service provider is an application providing a service, and the service endpoint is an access address of the service.

Correspondingly, the source mobile edge platform receives the service identifier and the service endpoint provided by the service provider.

Operation 602: The source mobile edge platform sends a route update request to a routing table controller, where the route update request includes a service endpoint and an IP address of the source mobile edge platform.

After receiving the service identifier and the service endpoint provided by the service provider, the source mobile edge platform sends the route update request to the routing table controller. The route update request is used to request the routing table controller to update a routing table of the service. The target mobile edge platform routes service-related data to the IP address of the source mobile edge platform by using an updated routing table.

In this embodiment, the routing table controller may be a software-defined networking (SDN) controller or a service function chain (SFC) controller.

Correspondingly, the routing table controller receives the route update request sent by the source mobile edge platform.

Operation 603: The service consumer sends a subscription request to the local mobile edge platform, where the subscription request includes a service identifier.

The service consumer is an application using the service.

Correspondingly, the local mobile edge platform receives the subscription request sent by the service consumer.

Operation 604: The local mobile edge platform sends a subscription request to the source mobile edge platform, where the subscription request includes the service identifier.

After receiving the subscription request sent by the service consumer, the local mobile edge platform obtains the service identifier included in the subscription request. The local mobile edge platform queries, based on the service identifier, the source mobile edge platform on which the corresponding service is located.

The local mobile edge platform queries the source mobile edge platform based on the service identifier in two manners:

Manner 1: The local mobile edge platform queries, from a management node based on the service identifier, the source mobile edge platform on which the service corresponding to the service identifier is located.

Manner 2: The local mobile edge platform sends a query packet to all mobile edge platforms, where the query packet includes the service identifier, and queries, based on the query packet, the source mobile edge platform on which the service corresponding to the service identifier is located.

Correspondingly, the source mobile edge platform receives the subscription request sent by the local mobile edge platform.

Operation 605: The source mobile edge platform sends service information to the local mobile edge platform, where the service information includes the service identifier and the service endpoint.

After receiving the subscription request sent by the local mobile edge platform, the source mobile edge platform sends the service information of the service to the local mobile edge platform that subscribes to the service. The service information includes the service identifier and the service endpoint of the subscribed service.

Correspondingly, the local mobile edge platform receives the service information sent by the source mobile edge platform.

Operation 603 to operation 605 in this embodiment are the same as operation 303 to operation 305 shown in the embodiment in FIG. 3A. For detailed descriptions, refer to operation 303 to operation 305 shown in the embodiment in FIG. 3A.

Operation 606: The local mobile edge platform sends the service information to the service consumer, where the service information includes the service identifier and the service endpoint.

The local mobile edge platform sends the received service information to the service consumer, so that the service consumer accesses the subscribed service based on the service endpoint.

Correspondingly, the service consumer receives the service information sent by the local mobile edge platform.

When the source mobile edge platform cannot meet a performance requirement required by the service provider, or the service provider cannot meet a service quality requirement, or the service provider cannot response to a load balance request, the service needs to be migrated from the source mobile edge platform to a target mobile edge platform. A migration process is shown in the following operation 607 to operation 615.

Operation 607: The source mobile edge platform sends a service migration request to the target mobile edge platform, where the service migration request includes the service identifier and the service endpoint.

The service migration request is used to request to migrate the service provided by the service provider.

There are two optional manners to determine whether the service needs to be migrated, and there also include two manners that cause the source mobile edge platform to send the service migration request to the target mobile edge platform. Details are as follows.

Manner 1: The source mobile edge platform detects whether the service needs to be migrated, and sends the service migration request to the target mobile edge platform when the service needs to be migrated; or if the service does not need to be migrated, the source mobile edge platform does not send the service migration request to the target mobile edge platform.

Manner 2: The service provider detects whether the service needs to be migrated, and sends a migration request to the source mobile edge platform when the service needs to be migrated, and the source mobile edge platform sends the service migration request to the target mobile edge platform after receiving the migration request sent by the service provider; or when the service does not need to be migrated, the service provider does not send a migration request to the source mobile edge platform.

It should be noted that, the target mobile edge platform may be determined by using a performance requirement and a load balance status that are provided. Determining of the target mobile edge platform is not limited in this embodiment of the present application.

Correspondingly, the target mobile edge platform receives the service migration request sent by the source mobile edge platform.

Operation 608: The target mobile edge platform stores the service identifier and the service endpoint carried in the service migration request.

After receiving the service migration request sent by the source mobile edge platform, the target mobile edge platform obtains the service identifier and the service endpoint in the service migration request, and stores the obtained service identifier and service endpoint in a memory of the target mobile edge platform.

Operation 609: The target mobile edge platform sends a route update request to the routing table controller, where the route update request includes the service endpoint and an IP address of the target mobile edge platform.

After storing the service identifier and the service endpoint, the target mobile edge platform sends the route update request to the routing table controller, and the route update request is used to request the routing table controller to update a routing table of the service. The target mobile edge platform routes the service-related data to the IP address of the target mobile edge platform by using an updated routing table.

Correspondingly, the routing table controller receives the route update request sent by the target mobile edge platform.

Operation 610: The target mobile edge platform sends a service migration response to the source mobile edge platform.

After updating the routing table of the service, the target mobile edge platform sends the service migration response to the source mobile edge platform. The service migration response is used to notify the source mobile edge platform that service migration is completed.

Correspondingly, the source mobile edge platform receives the service migration response sent by the target mobile edge platform.

Operation 611: The source mobile edge platform sends service migration information to the local mobile edge platform, where the service migration information includes the service identifier and the IP address of the target mobile edge platform.

After receiving the service migration response sent by the target mobile edge platform, the source mobile edge platform sends the service migration information to the local mobile edge platform that subscribes to the service. The service migration information includes the service identifier and the IP address of the target mobile edge platform. The service migration information is used to notify the local mobile edge platform that subscribes to the service that the service is migrated, and notify the local mobile edge platform of the IP address of the target mobile edge platform.

Correspondingly, the local mobile edge platform receives the service migration information sent by the source mobile edge platform.

Operation 612: The local mobile edge platform sends a subscription cancellation request to the source mobile edge platform, where the subscription cancellation request includes the service identifier.

The subscription cancellation request is used to cancel the subscribed service on the source mobile edge platform.

After receiving the service migration information sent by the source mobile edge platform, the local mobile edge platform sends the subscription cancellation request to the source mobile edge platform. The subscription cancellation request is used to cancel the service to which the local mobile edge platform subscribes on the source mobile edge platform.

Correspondingly, the source mobile edge platform receives the subscription cancellation request sent by the local mobile edge platform.

Operation 613: The local mobile edge platform sends a subscription request to the target mobile edge platform, where the subscription request includes the service identifier.

After cancelling the subscribed service on the source mobile edge platform, the local mobile edge platform sends the subscription request to the target mobile edge platform. The subscription request is used to request to subscribe to the service on the target mobile edge platform.

Correspondingly, the target mobile edge platform receives the subscription request sent by the local mobile edge platform.

Operation 614: The target mobile edge platform sends service information to the local mobile edge platform, where the service information includes the service identifier and the service endpoint.

After receiving the subscription request sent by the local mobile edge platform, the target mobile edge platform sends the service information to the local mobile edge platform that subscribes to the service. The service information includes the service identifier and the service endpoint.

Correspondingly, the local mobile edge platform receives the service information sent by the target mobile edge platform.

Operation 610 to operation 614 in this embodiment are the same as operation 310 to operation 314 shown in the embodiment in FIG. 3B and FIG. 3C. For detailed descriptions, refer to operation 310 to operation 314 shown in the embodiment in FIG. 3B and FIG. 3C.

Operation 615: The local mobile edge platform sends the service information to the service consumer, where the service information includes the service identifier and the service endpoint.

The local mobile edge platform forwards the service information to the service consumer after receiving the service information sent by the target mobile edge platform.

Correspondingly, the service consumer receives the service information sent by the local mobile edge platform, and accesses the subscribed service by using the service endpoint carried in the service information.

In conclusion, according to the service migration method provided in this embodiment, the local mobile edge platform subscribes to the service on the source mobile edge platform. When the service is migrated, the source mobile edge platform sends the service migration information to the local mobile edge platform that subscribes to the service, so that the local mobile edge platform that subscribes to the service cancels the subscribed service on the source mobile edge platform, re-subscribes to the service on the target mobile edge platform, and sends the route update request and a route update policy to the routing table controller by using the target mobile edge platform, to route the service-related data to the service endpoint. In this way, a problem of migrating the service provider from the source mobile edge platform to the target mobile edge platform is resolved, and it can be ensured that after the service provider is migrated from the source mobile edge platform to the target mobile edge platform, the service consumer that subscribes to the service on the source mobile edge platform can continue to correctly use the service migrated to the target mobile edge platform, so as to ensure availability and reliability of a service provided by the service consumer for user equipment.

Different from the embodiment shown in FIG. 3A, FIG. 3B, and FIG. 3C, in this embodiment, the target mobile edge platform sends the route update request to the routing table controller, so as to update the routing table of the service, and routes, by using the updated routing table, the service-related data to the service endpoint. Therefore, the local mobile edge platform that subscribes to the service accesses the migrated service by using the updated routing table.

In this embodiment, a source mobile edge server may include the service provider and the source mobile edge platform, a target mobile edge server may include the target mobile edge platform, and a local mobile edge server may include the local mobile edge platform, the service consumer, and a local service network function entity.

Figure 7A:
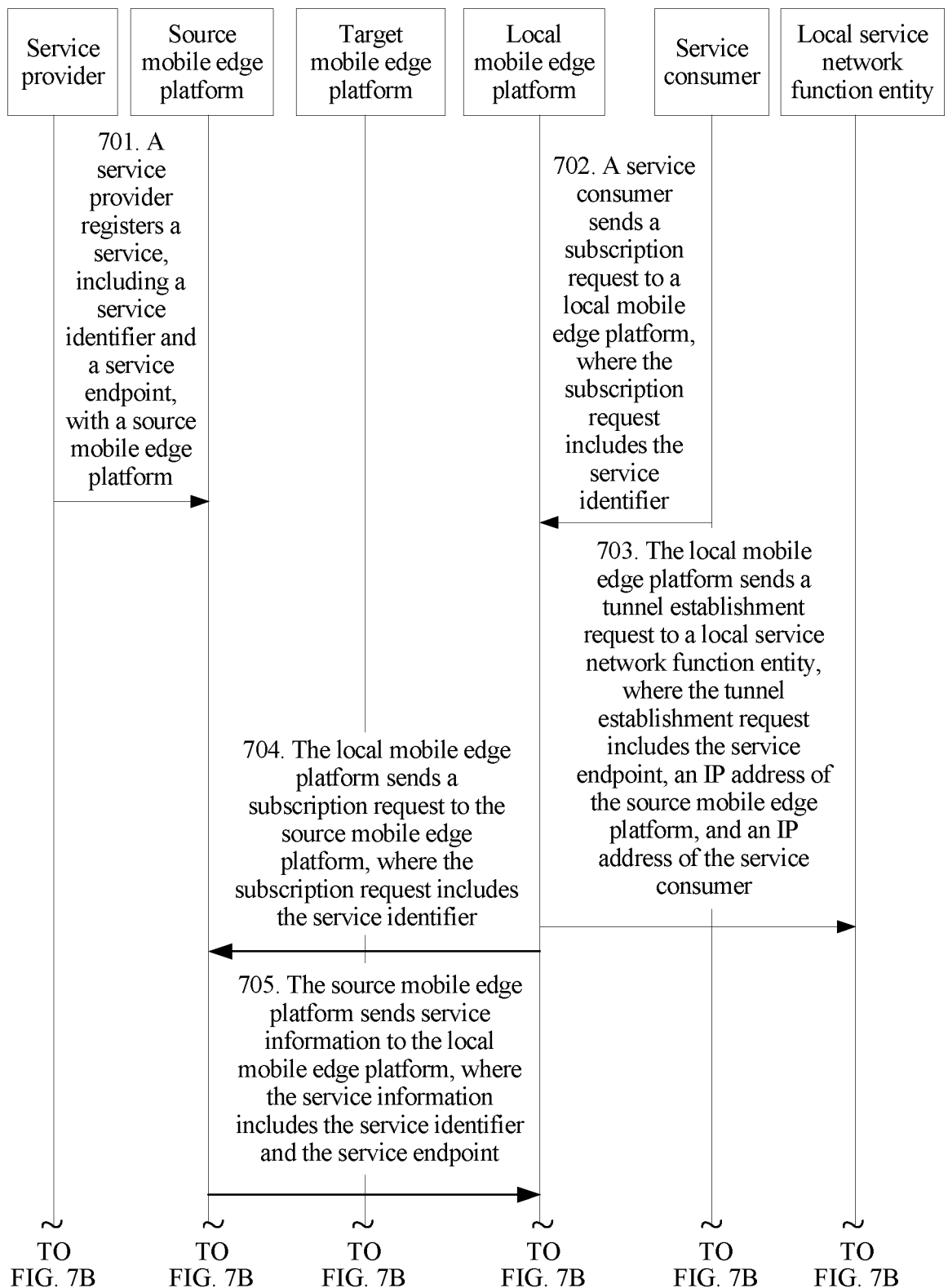
FIG. 7A, FIG. 7B, and FIG. 7C are a flowchart of a service migration method according to another example embodiment of the present application.
Figure 7B:
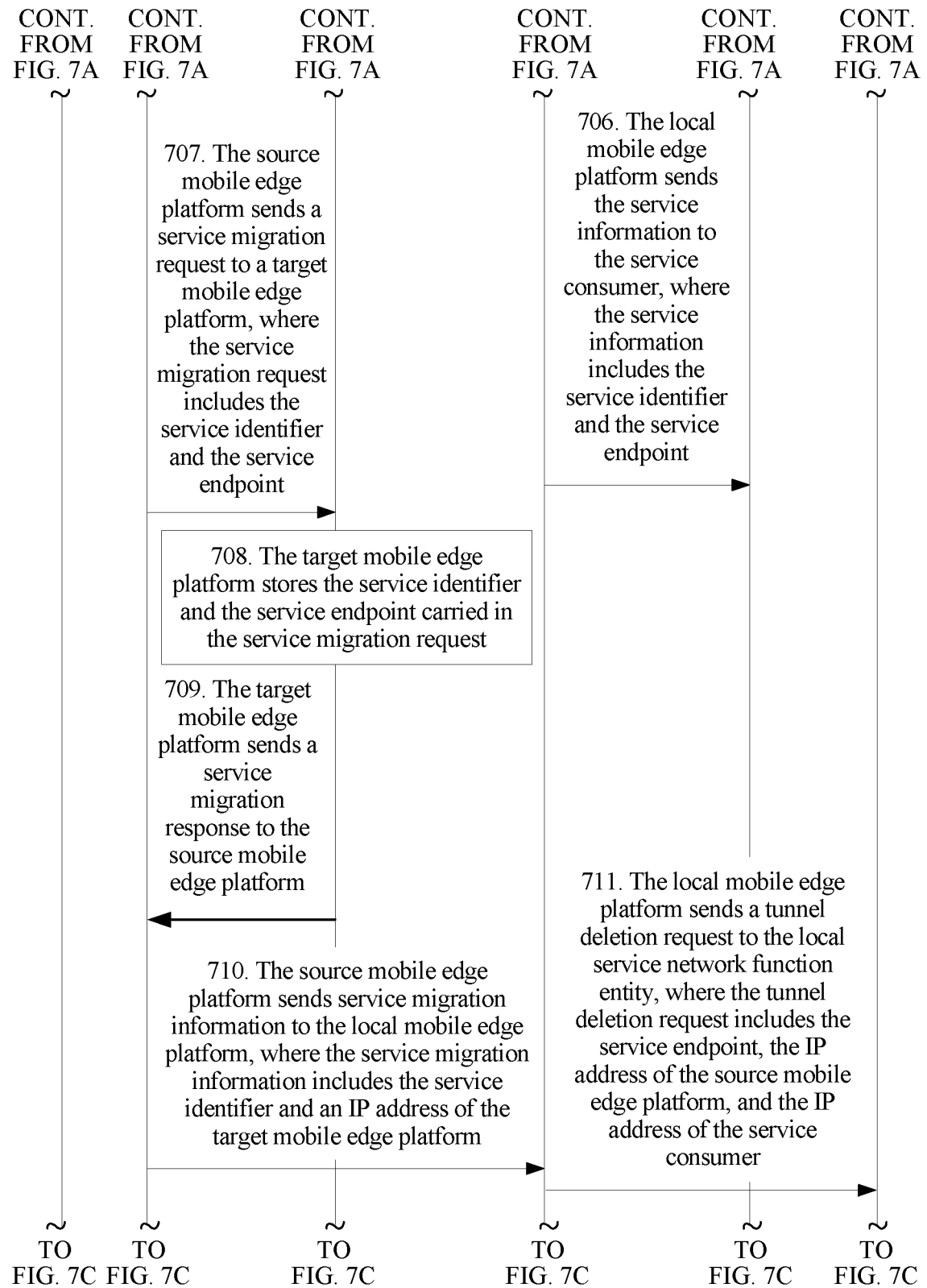
Figure 7C:
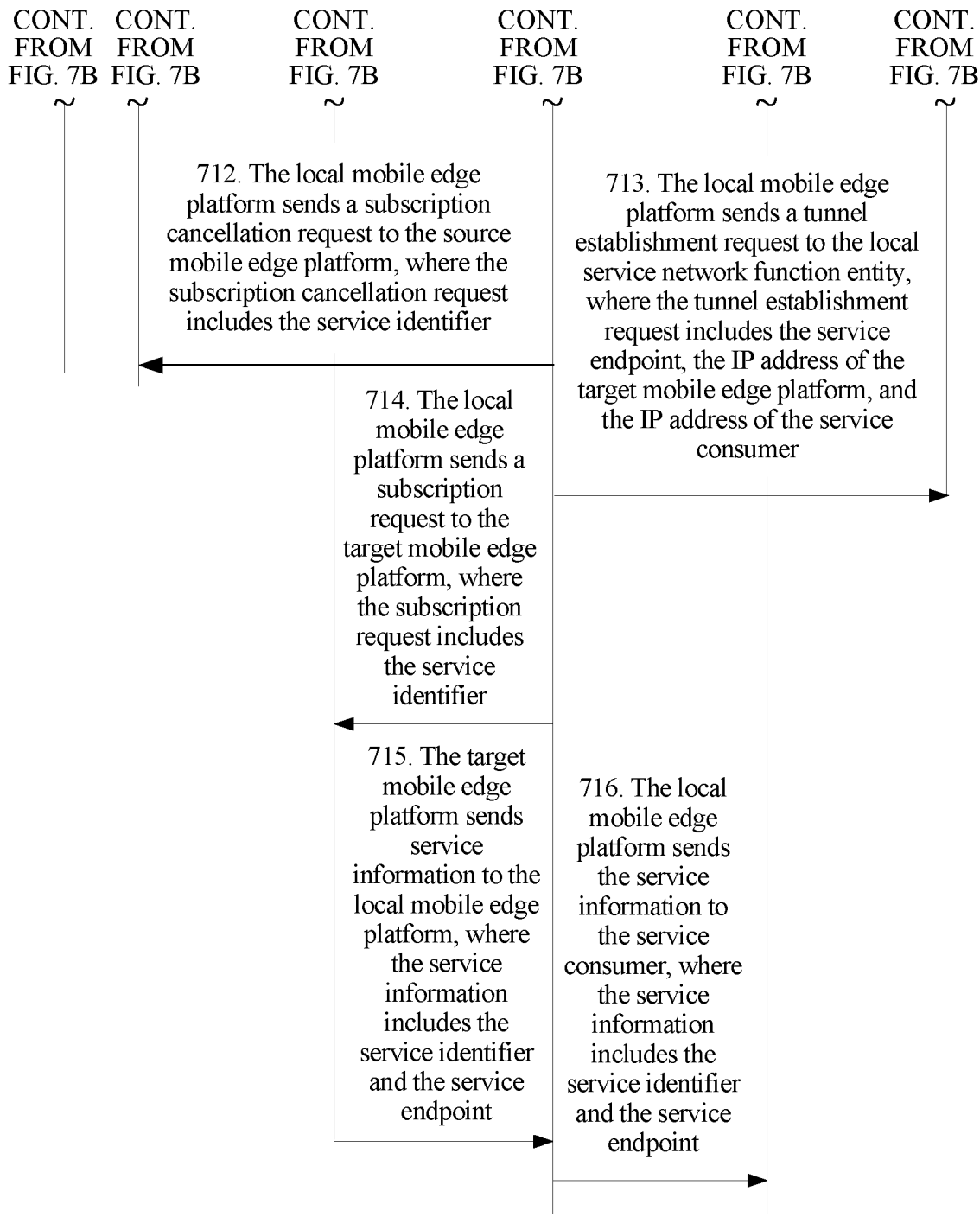

Referring to FIG. 7A, FIG. 7B, and FIG. 7C, FIG. 7A, FIG. 7B, and FIG. 7C are a flowchart of a service migration method according to another example embodiment of the present application. This embodiment is described by using an example in which the method is applied to the implementation environment shown in FIG. 1B. The service migration method includes the following operations.

Operation 701 to operation 706 are a process in which a service provider registers a service with a source mobile edge platform, and a service consumer on a local mobile edge platform uses the registered service.

Operation 701: The service provider registers a service with the source mobile edge platform.

In a registration process, the service provider provides a service identifier (Service ID) and a service endpoint (S-endpoint) to the source mobile edge platform.

The service provider is an application providing a service, and the service endpoint is an access address of the service.

Correspondingly, the source mobile edge platform receives the service identifier and the service endpoint provided by the service provider.

Operation 702: The service consumer sends a subscription request to the local mobile edge platform, where the subscription request includes a service identifier.

The service consumer is an application using the service.

Correspondingly, the local mobile edge platform receives the subscription request sent by the service consumer.

Operation 703: The local mobile edge platform sends a tunnel establishment request to a local service network function entity, where the tunnel establishment request includes a service endpoint, an IP address of the source mobile edge platform, and an IP address of the service consumer.

After receiving the subscription request sent by the service consumer, the local mobile edge platform sends the tunnel establishment request to the local service network function entity, to establish a tunnel between the local mobile edge platform and the source mobile edge platform. The tunnel is used to route service-related data to a source mobile edge server.

The local service network function entity provides a network service for the local mobile edge platform, and is used to transmit data between the local mobile edge platform and the source mobile edge platform. Optionally, the local service network function entity may be at least one of a communications bus, a data forwarding plane, a user data plane, a basic device, or an MEC server.

Correspondingly, the local service network function entity receives the tunnel establishment request sent by the local mobile edge platform, and establishes the tunnel between the local mobile edge platform and the source mobile edge platform.

After receiving the tunnel establishment request, the local service network function entity establishes the tunnel between the local mobile edge platform and the source mobile edge platform based on the IP address of the source mobile edge platform and the IP address of the service consumer, stores a correspondence between the service endpoint and the tunnel, and routes the service-related data to the source mobile edge server by using the corresponding tunnel.

Correspondingly, the source mobile edge platform stores the correspondence between the service endpoint and the tunnel. The tunnel is the tunnel between the local mobile edge platform and the source mobile edge platform, and is used to transmit data between the service consumer and the service provider.

Operation 704: The local mobile edge platform sends a subscription request to the source mobile edge platform, where the subscription request includes the service identifier.

After receiving the subscription request sent by the service consumer, the local mobile edge platform obtains the service identifier included in the subscription request. The local mobile edge platform queries, based on the service identifier, the source mobile edge platform on which the corresponding service is located.

The local mobile edge platform queries the source mobile edge platform based on the service identifier in two manners:

Manner 1: The local mobile edge platform queries, from a management node based on the service identifier, the source mobile edge platform on which the service corresponding to the service identifier is located.

Manner 2: The local mobile edge platform sends a query packet to all mobile edge platforms, where the query packet includes the service identifier, and queries, based on the query packet, the source mobile edge platform on which the service corresponding to the service identifier is located.

Correspondingly, the source mobile edge platform receives the subscription request sent by the local mobile edge platform.

Operation 705: The source mobile edge platform sends service information to the local mobile edge platform, where the service information includes the service identifier and the service endpoint.

After receiving the subscription request sent by the local mobile edge platform, the source mobile edge platform sends the service information to the local mobile edge platform that subscribes to the service. The service information includes the service identifier and the service endpoint of the subscribed service.

Correspondingly, the local mobile edge platform receives the service information sent by the source mobile edge platform.

Operation 704 and operation 705 in this embodiment are the same as operation 304 and operation 305 shown in the embodiment in FIG. 3A. For detailed descriptions, refer to operation 304 and operation 305 shown in the embodiment in FIG. 3A.

Operation 706: The local mobile edge platform sends the service information to the service consumer, where the service information includes the service identifier and the service endpoint.

The local mobile edge platform sends the received service information to the service consumer, so that the service consumer accesses the subscribed service based on the service endpoint.

Correspondingly, the service consumer receives the service information sent by the local mobile edge platform.

When the source mobile edge platform cannot meet a performance requirement required by the service provider, or the service provider cannot meet a service quality requirement, or the service provider cannot response to a load balance request, the service needs to be migrated from the source mobile edge platform to a target mobile edge platform. A migration process is shown in the following operation 707 to operation 716.

Operation 707: The source mobile edge platform sends a service migration request to the target mobile edge platform, where the service migration request includes the service identifier and the service endpoint.

The service migration request is used to request to migrate the service provided by the service provider.

There are two optional manners to determine whether the service needs to be migrated, and there also include two manners that cause the source mobile edge platform to send the service migration request to the target mobile edge platform. Details are as follows.

Manner 1: The source mobile edge platform detects whether the service needs to be migrated, and sends the service migration request to the target mobile edge platform when the service needs to be migrated; or if the service does not need to be migrated, the source mobile edge platform does not send the service migration request to the target mobile edge platform.

Manner 2: The service provider detects whether the service needs to be migrated, and sends a migration request to the source mobile edge platform when the service needs to be migrated, and the source mobile edge platform sends the service migration request to the target mobile edge platform after receiving the migration request sent by the service provider; or when the service does not need to be migrated, the service provider does not send a migration request to the source mobile edge platform.

Correspondingly, the target mobile edge platform receives the service migration request sent by the source mobile edge platform, and the target mobile edge platform stores the service endpoint carried in the service migration request.

It should be noted that, the target mobile edge platform may be determined by using a performance requirement and a load balance status that are provided. Determining of the target mobile edge platform is not limited in this embodiment of the present application.

Operation 708: The target mobile edge platform stores the service identifier and the service endpoint carried in the service migration request.

After receiving the service migration request sent by the source mobile edge platform, the target mobile edge platform obtains the service identifier and the service endpoint in the service migration request, and stores the obtained service identifier and service endpoint in a memory of the target mobile edge platform.

Operation 709: The target mobile edge platform sends a service migration response to the source mobile edge platform.

After storing the service identifier and the service endpoint, the target mobile edge platform sends the service migration response to the source mobile edge platform. The service migration response is used to notify the source mobile edge platform that service migration is completed.

Correspondingly, the source mobile edge platform receives the service migration response sent by the target mobile edge platform.

Operation 710: The source mobile edge platform sends service migration information to the local mobile edge platform, where the service migration information includes the service identifier and an IP address of the target mobile edge platform.

After receiving the service migration response sent by the target mobile edge platform, the source mobile edge platform sends the service migration information to the local mobile edge platform that subscribes to the service. The service migration information includes the service identifier and the IP address of the target mobile edge platform. The service migration information is used to notify the local mobile edge platform that subscribes to the service that the service is migrated, and notify the local mobile edge platform of the IP address of the target mobile edge platform.

Correspondingly, the local mobile edge platform receives the service migration information sent by the source mobile edge platform.

Operation 711: The local mobile edge platform sends a tunnel deletion request to the local service network function entity, where the tunnel deletion request includes the service endpoint, the IP address of the source mobile edge platform, and the IP address of the service consumer.

After receiving the service migration information sent by the source mobile edge platform, the local mobile edge platform sends the tunnel deletion request to the local service network function entity, to delete the tunnel established between the local mobile edge platform and the source mobile edge platform.

Correspondingly, the local service network function entity receives the tunnel deletion request sent by the local mobile edge platform, and deletes the tunnel between the local mobile edge platform and the source mobile edge platform. After receiving the tunnel deletion request, the local service network function entity deletes the tunnel between the local mobile edge platform and the source mobile edge platform based on the IP address of the source mobile edge platform and the IP address of the service consumer. The tunnel is used to transmit data between the service consumer and the service provider.

Correspondingly, the correspondence between the service endpoint and the tunnel is deleted from the source mobile edge platform.

Operation 712: The local mobile edge platform sends a subscription cancellation request to the source mobile edge platform, where the subscription cancellation request includes the service identifier.

The subscription cancellation request is used to cancel the subscribed service on the source mobile edge platform.

After receiving the service migration information sent by the source mobile edge platform, the local mobile edge platform sends the subscription cancellation request to the source mobile edge platform. The subscription cancellation request is used to cancel the service to which the local mobile edge platform subscribes on the source mobile edge platform.

Correspondingly, the source mobile edge platform receives the subscription cancellation request sent by the local mobile edge platform.

Operation 713: The local mobile edge platform sends a tunnel establishment request to the local service network function entity, where the tunnel establishment request includes the service endpoint, the IP address of the target mobile edge platform, and the IP address of the service consumer.

After cancelling the subscribed service on the source mobile edge platform, the local mobile edge platform sends the tunnel establishment request to the local service network function entity, to establish a tunnel between the local mobile edge platform and the target mobile edge platform. The tunnel is used to transmit data between the service consumer and the service provider.

The local service network function entity provides a network service for the local mobile edge platform, and is used to transmit data between the local mobile edge platform and the target mobile edge platform. Optionally, the local service network function entity may be at least one of a communications bus, a data forwarding plane, a user data plane, a basic device, or an MEC server.

Correspondingly, the local service network function entity receives the tunnel establishment request sent by the local mobile edge platform, and establishes the tunnel between the local mobile edge platform and the target mobile edge platform. After receiving the tunnel establishment request, the local service network function entity establishes the tunnel between the local mobile edge platform and the target mobile edge platform based on the IP address of the target mobile edge platform and the IP address of the service consumer. The local service network function entity stores a correspondence between the service endpoint and the established tunnel, and routes, by using the tunnel, the service-related data to a target mobile edge server.

Correspondingly, the target mobile edge platform stores the correspondence between the service endpoint and the tunnel. The tunnel is the tunnel between the local mobile edge platform and the target mobile edge platform, and is used to transmit data between the service consumer and the service provider.

Operation 714: The local mobile edge platform sends a subscription request to the target mobile edge platform, where the subscription request includes the service identifier.

After the tunnel is established between the local mobile edge platform and the target mobile edge platform, the local mobile edge platform sends the subscription request to the target mobile edge platform. The subscription request is used to request to subscribe to the service on the target mobile edge platform.

Correspondingly, the target mobile edge platform receives the subscription request sent by the local mobile edge platform.

Operation 715: The target mobile edge platform sends service information to the local mobile edge platform, where the service information includes the service identifier and the service endpoint.

After receiving the subscription request sent by the local mobile edge platform, the target mobile edge platform sends the service information to the local mobile edge platform that subscribes to the service. The service information includes the service identifier and the service endpoint.

Correspondingly, the local mobile edge platform receives the service information sent by the target mobile edge platform.

Operation 714 and operation 715 in this embodiment are the same as operation 313 and operation 314 shown in the embodiment in FIG. 3C. For detailed descriptions, refer to operation 313 and operation 314 shown in the embodiment in FIG. 3C.

Operation 716: The local mobile edge platform sends the service information to the service consumer, where the service information includes the service identifier and the service endpoint.

The local mobile edge platform forwards the service information to the service consumer after receiving the service information sent by the target mobile edge platform.

Correspondingly, the service consumer receives the service information sent by the local mobile edge platform, and accesses the subscribed service by using the service endpoint carried in the service information.

In conclusion, according to the service migration method provided in this embodiment, the local mobile edge platform subscribes to the service on the source mobile edge platform. When the service is migrated, the source mobile edge platform sends the service migration information to the local mobile edge platform that subscribes to the service, so that the local mobile edge platform that subscribes to the service cancels the subscribed service on the source mobile edge platform, re-subscribes to the service on the target mobile edge platform, and updates a routing policy by establishing the tunnel between the local mobile edge platform and the target mobile edge platform, to route the service-related data to the service endpoint. In this way, a problem of migrating the service provider from the source mobile edge platform to the target mobile edge platform is resolved, and it can be ensured that after the service provider is migrated from the source mobile edge platform to the target mobile edge platform, the service consumer that subscribes to the service on the source mobile edge platform can continue to correctly use the service migrated to the target mobile edge platform, so as to ensure availability and reliability of a service provided by the service consumer for user equipment.

Different from the embodiment shown in FIG. 3A, FIG. 3B, and FIG. 3C, in this embodiment, the target mobile edge platform establishes the routing policy between the local mobile edge platform and the target mobile edge platform by establishing the tunnel between the local mobile edge platform and the target mobile edge platform, so that the local mobile edge platform that subscribes to the service can access the migrated service by using the established tunnel.

Figure 4A:
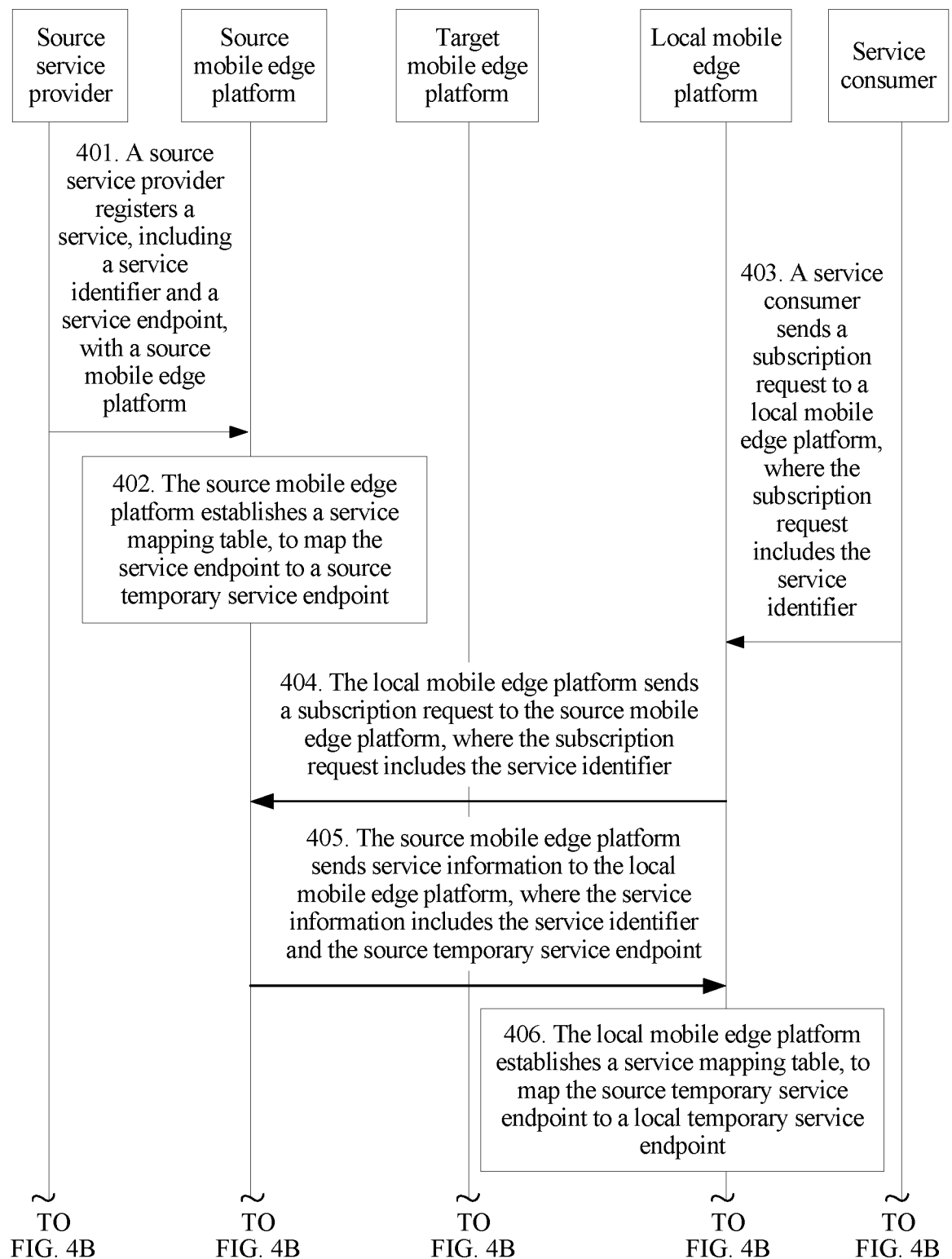
FIG. 4A, FIG. 4B, FIG. 4C, and FIG. 4D are a flowchart of a service migration method according to another example embodiment of the present application.
Figure 4B:
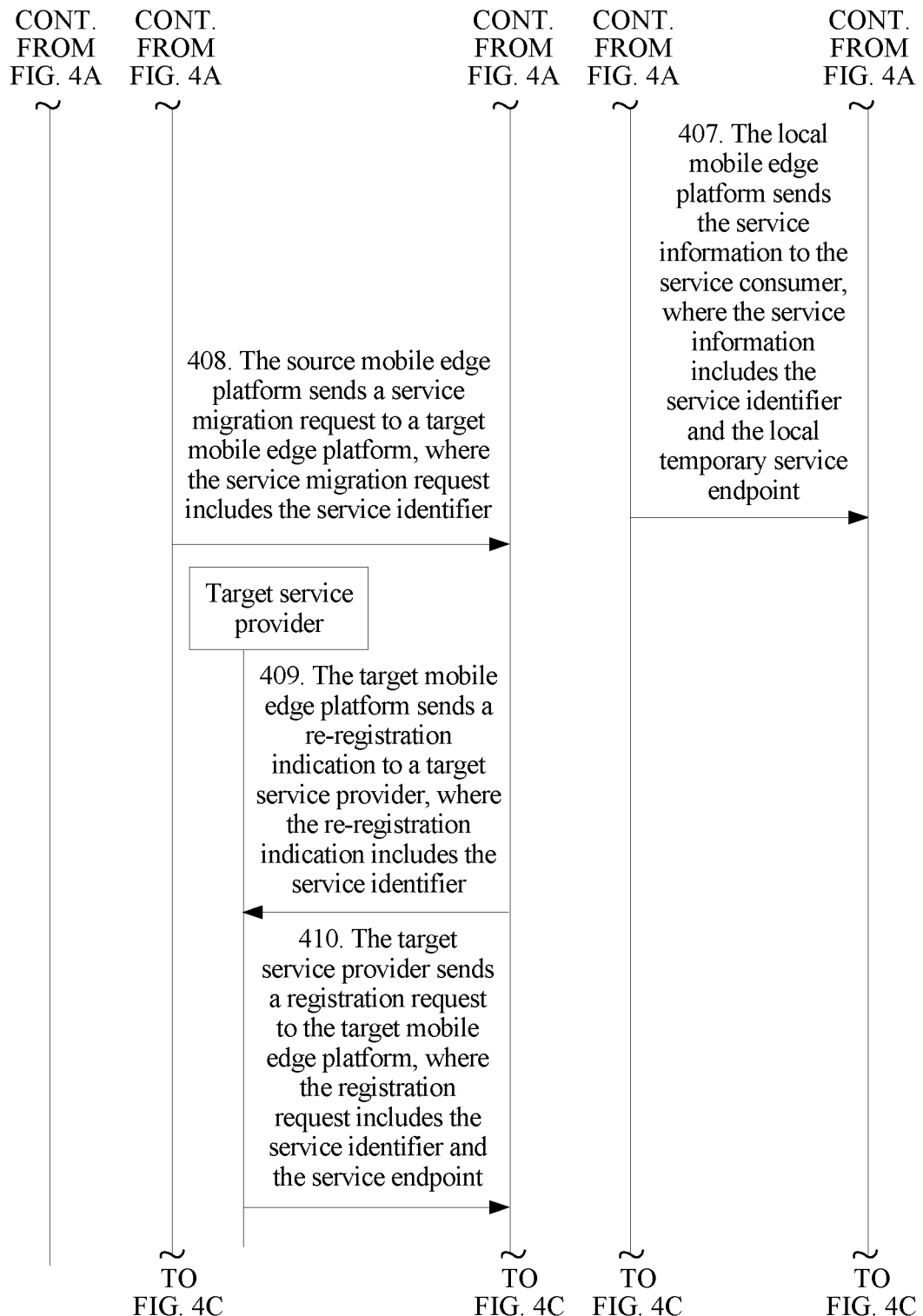
Figure 4C:
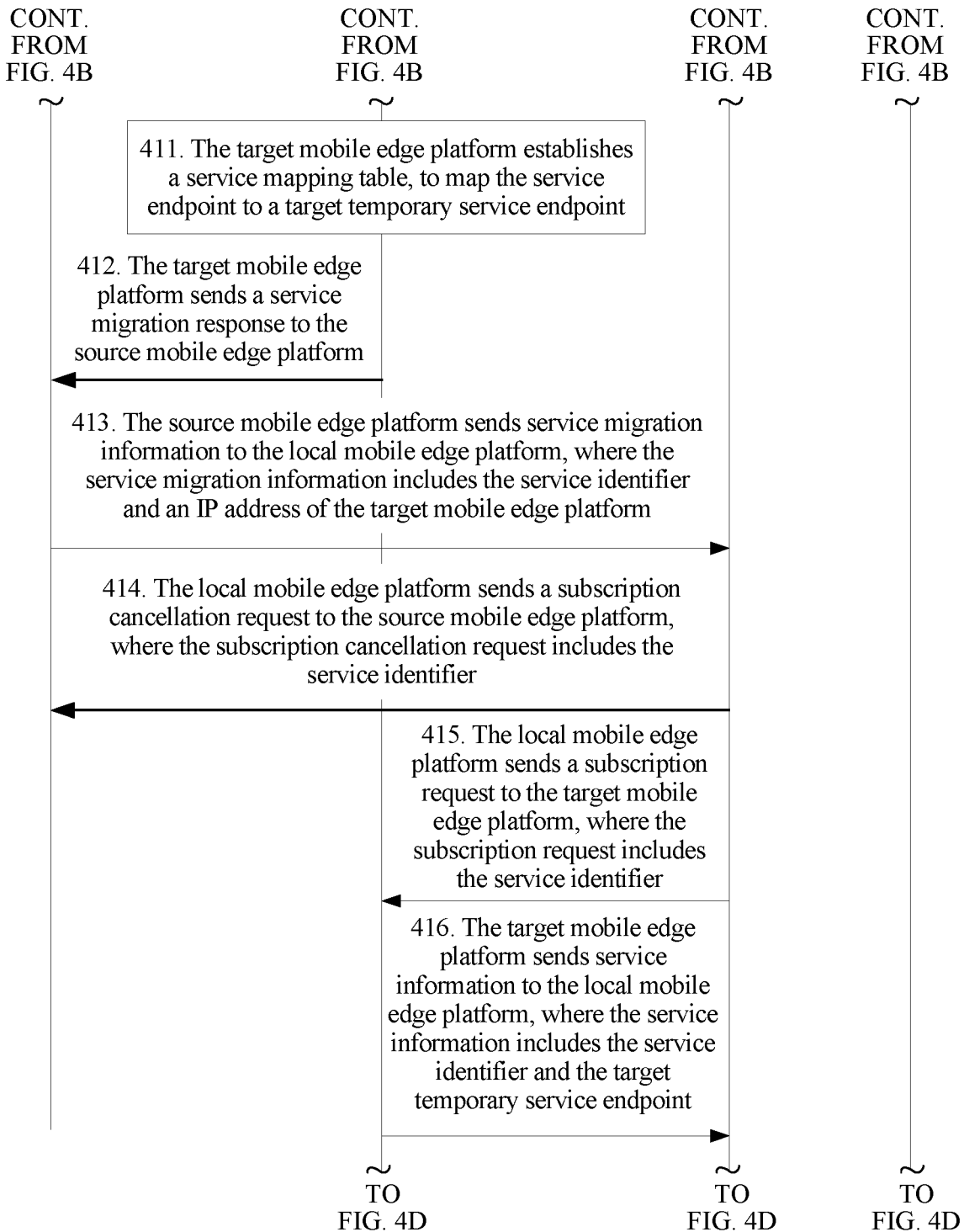
Figure 4D:
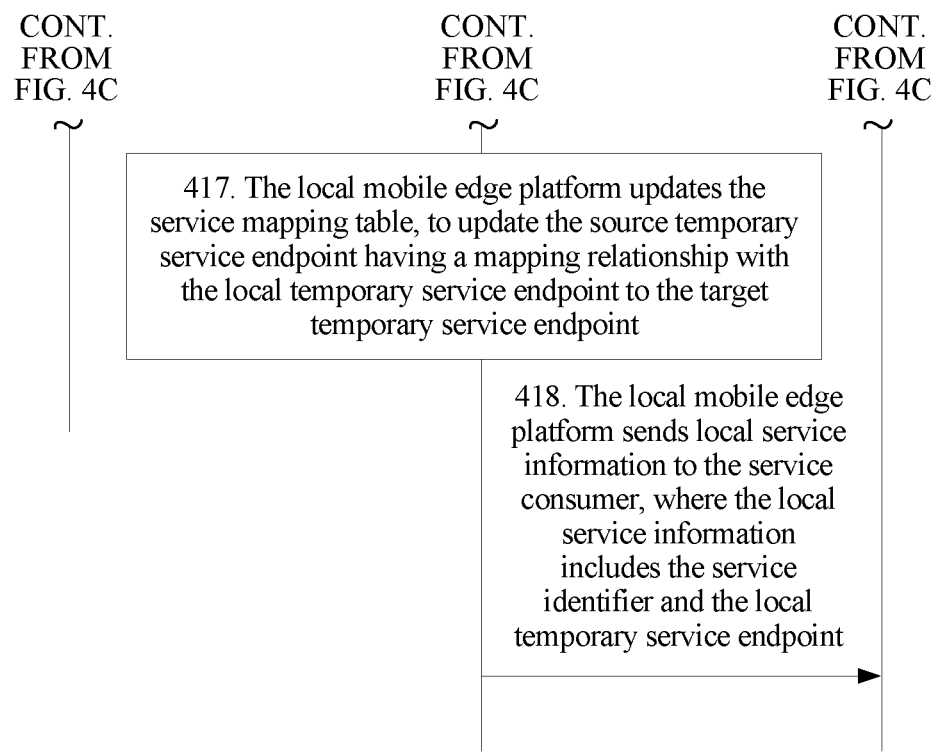

It should be noted that, after the target mobile edge platform receives the service migration request sent by the source mobile edge platform, the embodiment in FIG. 3A, FIG. 3B, and FIG. 3C, the embodiment in FIG. 5A, FIG. 5B, and FIG. 5C, the embodiment in FIG. 6A, FIG. 6B, and FIG. 6C, and the embodiment in FIG. 7A, FIG. 7B, and FIG. 7C of the present application may further include operation 409 and operation 410 in the embodiment in FIG. 4B. The service provider re-registers the service with the target mobile edge platform. When re-registering the service, the service provider provides a service identifier and a service endpoint of the service to the target mobile edge platform. When the service is re-registered, the service endpoint of the service may be the same as or different from the service endpoint provided when the service is registered with the source mobile edge platform.

It should be further noted that, in the embodiment in FIG. 3A, FIG. 3B, and FIG. 3C to the embodiment in FIG. 7A, FIG. 7B, and FIG. 7C, operations related to a target mobile edge platform side may be independently implemented as a service migration method on the target mobile edge platform side, operations related to a source mobile edge platform side may be independently implemented as a service migration method on the source mobile edge platform side, and operations related to a local mobile edge platform side may be independently implemented as a service migration method on the local mobile edge platform side.

Figure 8:
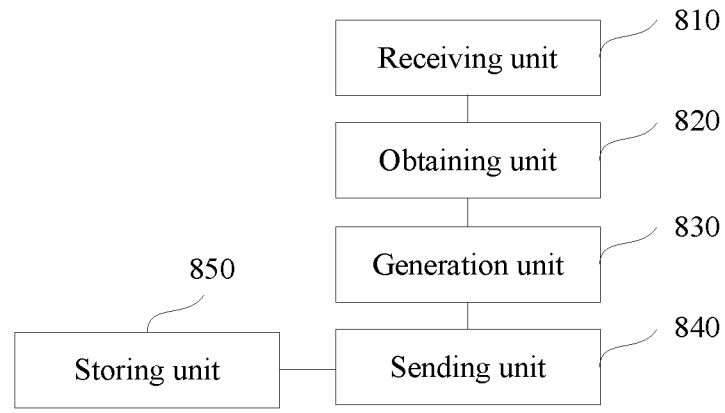
FIG. 8 is a block diagram of a service migration apparatus according to an example embodiment of the present application.

Referring to FIG. 8, FIG. 8 is a block diagram of a service migration apparatus according to an example embodiment of the present application. The service migration apparatus may be implemented as all or a part of a target mobile edge platform by using software, hardware, or a combination thereof. The service migration apparatus may include a receiving unit 810, an obtaining unit 820, and a sending unit 840.

The receiving unit 810 is configured to receive a service migration request sent by a source mobile edge platform, where the service migration request is used to request to migrate a service provided by a service provider, the service migration request includes a service identifier of the service, and the service identifier is used to identify the service in at least one service.

The obtaining unit 820 is configured to obtain a service endpoint corresponding to the service identifier, where the service endpoint is an access address used when the service provider provides the service.

The sending unit 840 is configured to send a service migration response to the source mobile edge platform.

For related details, refer to the foregoing method embodiment.

In another optional embodiment, the service migration apparatus further includes a generation unit 830.

The generation unit 830 is configured to generate a target temporary service endpoint based on the service endpoint and an IP address of a target mobile edge platform, where the target temporary service endpoint is an access address used when the service provider provides the service by using the target mobile edge platform.

In another optional embodiment, the sending unit 840 is further configured to send a route update request to a routing table controller, where the route update request includes the service endpoint and an IP address of a target mobile edge platform, and the route update request is used to request the routing table controller to update a path pointing to the service endpoint.

In another optional embodiment, the service migration apparatus further includes a storing unit 850.

The storing unit 850 is configured to store a correspondence between the service endpoint and a tunnel, where the tunnel is a tunnel between a local mobile edge platform and a target mobile edge platform, the local mobile edge platform is a mobile edge platform on which a service consumer using the service is located, and the tunnel is used to transmit data between the service consumer and the service provider.

In another optional embodiment, the receiving unit 810 is further configured to receive a subscription request sent by a local mobile edge platform, where the subscription request is used to subscribe to the service on the target mobile edge platform.

The sending unit 830 is further configured to send service information to the local mobile edge platform, where the service information includes the service identifier and the target temporary service endpoint.

In another optional embodiment, the receiving unit 810 is further configured to receive a subscription request sent by the local mobile edge platform, where the subscription request is used to subscribe to the service on the target mobile edge platform.

The sending unit 840 is further configured to send service information to the local mobile edge platform, where the service information includes the service identifier and the service endpoint.

In another possible embodiment, the obtaining unit 820 is further configured to obtain, from the service migration request, the service endpoint corresponding to the service identifier; or the receiving unit 810 is further configured to receive the service endpoint that is corresponding to the service identifier and that is sent by the service provider.

In another possible embodiment, the receiving unit 810 is further configured to receive a registration request sent by the service provider, where the registration request includes the service endpoint corresponding to the service identifier; or the sending unit 840 is further configured to send a re-registration indication to the service provider, and the receiving unit 810 is further configured to receive a registration request sent by the service provider, where the registration request includes the service endpoint corresponding to the service identifier.

In conclusion, according to the service migration apparatus provided in this embodiment, the source mobile edge platform sends the service migration request to the target mobile edge platform, and the service migration request includes the service identifier of the service. The target mobile edge platform obtains the service endpoint corresponding to the service identifier, and the target mobile edge platform sends the service migration response to the source mobile edge platform. In this way, a problem of migrating the service provider from the source mobile edge platform to the target mobile edge platform is resolved, and it can be ensured that after the service provider is migrated from the source mobile edge platform to the target mobile edge platform, the service consumer that subscribes to the service on the source mobile edge platform can continue to correctly use the service migrated to the target mobile edge platform, so as to ensure availability and reliability of a service provided by the service consumer for user equipment.

Figure 9:
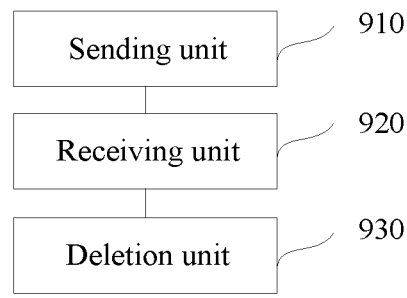
FIG. 9 is a block diagram of a service migration apparatus according to another example embodiment of the present application.

Referring to FIG. 9, FIG. 9 is a block diagram of a service migration apparatus according to another example embodiment of the present application. The service migration apparatus may be implemented as all or a part of a source mobile edge platform by using software, hardware, or a combination thereof. The service migration apparatus may include a sending unit 910 and a receiving unit 920.

The sending unit 910 is configured to send a service migration request to a target mobile edge platform, where the service migration request is used to request to migrate a service provided by a service provider, the service migration request includes a service identifier of the service, and the service identifier is used to identify the service in at least one service.

The receiving unit 920 is configured to receive a service migration response sent by the target mobile edge platform.

For related details, refer to the foregoing method embodiment.

In another possible embodiment, the sending unit 910 is further configured to send the service migration request to the target mobile edge platform when determining that the service needs to be migrated; or the receiving unit 920 is further configured to receive a migration request sent by the service provider, where the migration request is sent by the service provider when the service provider determines that the service needs to be migrated; and the sending unit 910 is further configured to send the service migration request to the target mobile edge platform.

In another possible embodiment, the sending unit 910 is further configured to send service migration information to a local mobile edge platform that subscribes to the service, where the service migration information includes the service identifier and an IP address of the target mobile edge platform, and the local mobile edge platform is a mobile edge platform on which a service consumer using the service is located.

The receiving unit 920 is further configured to receive a subscription cancellation request sent by the local mobile edge platform, where the subscription cancellation request is used to cancel the subscribed service on a source mobile edge platform.

In another optional embodiment, the service migration apparatus further includes a deletion unit 930.

The deletion unit 930 is configured to delete a correspondence between a service endpoint and a tunnel, where the service endpoint is an access address used when the service provider provides the service, the tunnel is a tunnel between the local mobile edge platform and the source mobile edge platform, and the tunnel is used to transmit data between the service consumer and the service provider.

In conclusion, the service migration apparatus provided in this embodiment sends the service migration request to the target mobile edge platform, and receives the service migration response sent by the target mobile edge platform. In this way, a problem of migrating the service provider from the source mobile edge platform to the target mobile edge platform is resolved, and it can be ensured that after the service provider is migrated from the source mobile edge platform to the target mobile edge platform, the service consumer that subscribes to the service on the source mobile edge platform can continue to correctly use the service migrated to the target mobile edge platform, so as to ensure availability and reliability of a service provided by the service consumer for user equipment.

Figure 10:
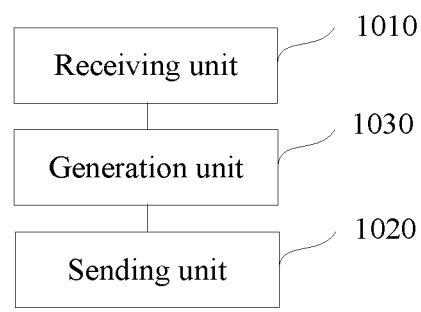
FIG. 10 is a block diagram of a service migration apparatus according to another example embodiment of the present application.

Referring to FIG. 10, FIG. 10 is a block diagram of a service migration apparatus according to still another example embodiment of the present application. The service migration apparatus may be implemented as all or a part of a local mobile edge platform by using software, hardware, or a combination thereof. The service migration apparatus may include a receiving unit 1010 and a sending unit 1020.

The receiving unit 1010 is configured to receive service migration information sent by a source mobile edge platform, where the service migration information is used to indicate that a service provided by a service provider has been migrated to a target mobile edge platform, the service migration information includes a service identifier of the service and an IP address of the target mobile edge platform, and the service identifier is used to identify the service in at least one service.

The sending unit 1020 is configured to send a subscription cancellation request to the source mobile edge platform based on the service migration information, where the subscription cancellation request is used to cancel the subscribed service on the source mobile edge platform.

The sending unit 1020 is further configured to send a subscription request to the target mobile edge platform based on the IP address of the target mobile edge platform, where the subscription request is used to subscribe to the service on the target mobile edge platform.

The receiving unit 1010 is further configured to receive service information sent by the target mobile edge platform, where the service information includes the service identifier.

For related details, refer to the foregoing method embodiment.

In another possible embodiment, the sending unit 1020 is further configured:

send a tunnel deletion request to a local service network function entity, where the tunnel deletion request is used to delete a tunnel between a local mobile edge platform and the source mobile edge platform; and send a tunnel establishment request to the local service network function entity, where the tunnel establishment request is used to establish a tunnel between the local mobile edge platform and the target mobile edge platform.

In another possible embodiment, the service information further includes a target temporary service endpoint of the service, and the target temporary service endpoint is an access address used when the target mobile edge platform provides the service.

In another possible embodiment, the service information further includes a service endpoint of the service, and the service endpoint is an access address used when the service provider provides the service.

In another optional embodiment, the service migration apparatus further includes a generation unit 1030.

The generation unit 1030 is configured to generate a local temporary service endpoint based on the target temporary service endpoint and an IP address of a local mobile edge platform, where the local temporary service endpoint is an access address used when the service provider provides the service by using the local mobile edge platform.

The sending unit 1020 is further configured to send local service information to a service consumer using the service, where the local service information includes the service identifier and the local temporary service endpoint.

In conclusion, the service migration apparatus provided in this embodiment receives the service migration information sent by the source mobile edge platform, sends the subscription cancellation request to the source mobile edge platform, sends the subscription request to the target mobile edge platform, and receives the service information sent by the target mobile edge platform. In this way, a problem of migrating the service provider from the source mobile edge platform to the target mobile edge platform is resolved, and it can be ensured that after the service provider is migrated from the source mobile edge platform to the target mobile edge platform, the service consumer that subscribes to the service on the source mobile edge platform can continue to correctly use the service migrated to the target mobile edge platform, so as to ensure availability and reliability of a service provided by the service consumer for user equipment.

Figure 11:
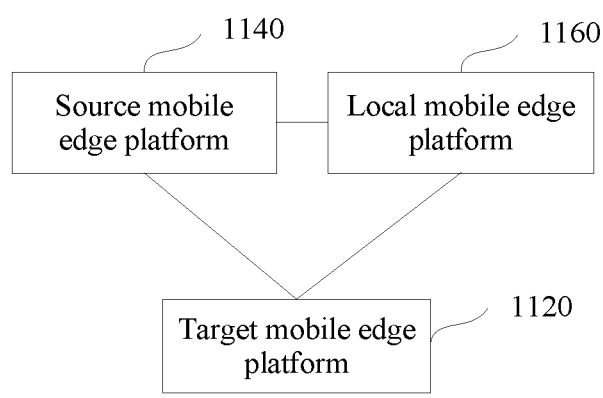
FIG. 11 is a block diagram of a service migration system according to an example embodiment of the present application.

Referring to FIG. 11, FIG. 11 is a block diagram of a service migration system according to an example embodiment of the present application. The service migration system may include a target mobile edge platform 1120, a source mobile edge platform 1140, and the local mobile edge platform 1160.

The target mobile edge platform is the service migration apparatus shown in the embodiment in FIG. 8.

The source mobile edge platform is the service migration apparatus shown in the embodiment in FIG. 9.

The local mobile edge platform is the service migration apparatus shown in the embodiment in FIG. 10.

A person of ordinary skill in the art may understand that all or some of the operations of the embodiments may be implemented by hardware or a program instructing related hardware. The program may be stored in a computer-readable storage medium. The storage medium may be a read-only memory, a magnetic disk, an optical disc, or the like.

The foregoing descriptions are merely example embodiments of the present application, but are not intended to limit the present application. Any modification, equivalent replacement, and improvement made without departing from the spirit and principle of the present application shall fall within the protection scope of the present application.

What is claimed is:

1. A service migration apparatus, wherein the apparatus comprises: a processor and a memory, wherein the memory stores program instructions, and the processor is configured to execute the program instructions stored in the memory to perform the following operations:

receiving a service migration request from a source mobile edge platform, wherein the service migration request is used to request to migrate a service provided by a service provider, the service migration request comprises a service identifier of the service, and the service identifier is used to identify the service in one or more services;

obtaining a service endpoint corresponding to the service identifier, wherein the service endpoint is an access address used when the service provider provides the service;

sending a service migration response to the source mobile edge platform;

sending a route update request to a routing table controller, wherein the route update request comprises the service endpoint and an IP address of a target mobile edge platform, and the route update request is used to request the routing table controller to update a path pointing to the service endpoint;

receiving a subscription request from a local mobile edge platform, wherein the subscription request is used to subscribe to the service on the target mobile edge platform; and sending service information to the local mobile edge platform, wherein the service information comprises the service identifier and the service endpoint.

2. The apparatus according to claim 1, wherein the operations further comprise: generating a target temporary service endpoint based on the service endpoint and an Internet Protocol (IP) address of a target mobile edge platform, wherein the target temporary service endpoint is an access address used when the service provider provides the service by using the target mobile edge platform.

3. The apparatus according to claim 1, wherein the operations further comprise:

storing a correspondence between the service endpoint and a tunnel, wherein the tunnel is a tunnel between the local mobile edge platform and a target mobile edge platform, the local mobile edge platform is a mobile edge platform on which a service consumer using the service is located, and the tunnel is used to transmit data between the service consumer and the service provider.

4. The apparatus according to claim 2, wherein the operations further comprise:

receiving a subscription request from the local mobile edge platform, wherein the subscription request is used to subscribe to the service on the target mobile edge platform; and sending service information to the local mobile edge platform, wherein the service information comprises the service identifier and the target temporary service endpoint.

5. The apparatus according to claim 1, wherein the operations further comprise: obtaining, from the service migration request, the service endpoint corresponding to the service identifier; or receiving the service endpoint that is corresponding to the service identifier from the service provider.

6. The apparatus according to claim 5, wherein the operations further comprise:
- receiving a registration request from the service provider, wherein the registration request comprises the service endpoint corresponding to the service identifier; or
- sending a re-registration indication to the service provider, and receiving the registration request from the service provider, wherein the registration request comprises the service endpoint corresponding to the service identifier.

7. A service migration apparatus, wherein the apparatus comprises:
- a processor and a memory, wherein the memory stores program instructions, and the processor is configured to execute the program instructions stored in the memory to perform the following operations:
  - sending a service migration request to a target mobile edge platform, wherein the service migration request is used to request to migrate a service provided by a service provider, the service migration request comprises a service identifier of the service, and the service identifier is used to identify the service in one or more services;
  - receiving a service migration response from the target mobile edge platform; sending service migration information to a local mobile edge platform that subscribes to the service, wherein the service migration information comprises the service identifier and an Internet Protocol (IP) address of the target mobile edge platform, and the local mobile edge platform is a mobile edge platform on which a service consumer using the service is located; and
  - receiving a subscription cancellation request from the local mobile edge platform, wherein the subscription cancellation request is used to cancel the subscribed service on a source mobile edge platform.

8. The apparatus according to claim 7, wherein the operations further comprise:
- sending the service migration request to the target mobile edge platform when determining that the service needs to be migrated; or
- receiving a service migration request from the service provider, wherein the service migration request is sent by the service provider when the service provider determines that the service needs to be migrated; and sending the service migration request to the target mobile edge platform.

9. The apparatus according to claim 7, wherein the operations further comprise:
- deleting a correspondence between a service endpoint and a tunnel, wherein the service endpoint is an access address used when the service provider provides the service, the tunnel is a tunnel between the local mobile edge platform and the source mobile edge platform, and the tunnel is used to transmit data between the service consumer and the service provider.

10. A service migration apparatus, wherein the apparatus comprises:
- a processor and a memory, wherein the memory stores program instructions, and the processor is configured to execute the program instructions stored in the memory to perform the following operations:
  - receiving service migration information from a source mobile edge platform, wherein the service migration information is used to indicate that a service provided by a service provider has been migrated to a target mobile edge platform, the service migration information comprises a service identifier of the service and an Internet Protocol (IP) address of the target mobile edge platform, and the service identifier is used to identify the service in one or more services, wherein the service migration information further comprises a target temporary service endpoint of the service, and the target temporary service endpoint is an access address used when the service provider provides the service by using the target mobile edge platform; and
  - sending a subscription cancellation request to the source mobile edge platform based on the service migration information, wherein the subscription cancellation request is used to cancel the subscribed service on the source mobile edge platform;
  - sending a subscription request to the target mobile edge platform based on the IP address of the target mobile edge platform, wherein the subscription request is used to subscribe to the service on the target mobile edge platform; and
  - receiving service information from the target mobile edge platform, wherein the service information comprises the service identifier.

11. The apparatus according to claim 10, wherein the operations further comprise:
- sending a tunnel deletion request to a local service network function entity, wherein the tunnel deletion request is used to delete a tunnel between a local mobile edge platform and the source mobile edge platform; and
- sending a tunnel establishment request to the local service network function entity, wherein the tunnel establishment request is used to establish a tunnel between the local mobile edge platform and the target mobile edge platform.

12. The apparatus according to claim 10, wherein the service migration information further comprises a service endpoint of the service, and the service endpoint is an access address used when the service provider provides the service.

13. The apparatus according to claim 10, wherein the operations further comprise:
- generating a local temporary service endpoint based on the target temporary service endpoint and an IP address of a local mobile edge platform, wherein the local temporary service endpoint is an access address used when the service provider provides the service by using the local mobile edge platform; and
- sending local service information to a service consumer using the service, wherein the local service information comprises the service identifier and the local temporary service endpoint.

14. The apparatus according to claim 10, wherein the operations further comprise: sending the service information to a service consumer using the service.

* * * * *